United States Patent
Mizutani et al.

(10) Patent No.: US 8,144,049 B2
(45) Date of Patent: Mar. 27, 2012

(54) RADAR WITH NON-UNIFORMLY SPACED ANTENNA ARRAY

(75) Inventors: Akiyoshi Mizutani, Kariya (JP); Koichiro Suzuki, Yokohama (JP)

(73) Assignee: Denso Corporation, Kariya, Aichi-Pref (JP)

( * ) Notice: Subject to any disclaimer, the term of this patent is extended or adjusted under 35 U.S.C. 154(b) by 357 days.

(21) Appl. No.: 12/509,655

(22) Filed: Jul. 27, 2009

(65) Prior Publication Data

US 2010/0019954 A1    Jan. 28, 2010

(30) Foreign Application Priority Data

Jul. 28, 2008  (JP) .................. 2008-193764

(51) Int. Cl.
*G01S 13/00* (2006.01)
*G01S 13/93* (2006.01)
(52) U.S. Cl. ...................... 342/147; 342/189
(58) Field of Classification Search .............. 342/147
See application file for complete search history.

(56) References Cited

U.S. PATENT DOCUMENTS

| | | | | |
|---|---|---|---|---|
| H000374 H | * | 11/1987 | Abo-Zena et al. | 342/378 |
| 5,990,834 A | * | 11/1999 | Barrick et al. | 342/418 |
| 6,642,888 B2 | * | 11/2003 | Kishigami et al. | 342/417 |
| 6,836,245 B2 | * | 12/2004 | Kishigami et al. | 342/417 |
| 6,897,807 B2 | * | 5/2005 | Kishigami et al. | 342/417 |
| 7,372,404 B2 | * | 5/2008 | Shirai et al. | 342/417 |
| 7,474,252 B2 | * | 1/2009 | Natsume et al. | 342/70 |
| 7,486,230 B2 | * | 2/2009 | Takano et al. | 342/189 |
| 7,567,201 B2 | * | 7/2009 | Miyake | 342/70 |
| 7,714,782 B2 | * | 5/2010 | Davis et al. | 342/377 |
| 7,755,537 B2 | * | 7/2010 | Shimizu | 342/147 |
| 7,812,759 B2 | * | 10/2010 | Kai | 342/107 |

(Continued)

FOREIGN PATENT DOCUMENTS

| | | |
|---|---|---|
| JP | 2000-121716 | 4/2000 |
| JP | 2006-047282 | 2/2006 |

OTHER PUBLICATIONS

Nakazawa et al., "Estimating Angle of Arrival with Non-uniformly Spaced Array", IEICE Transactions on Information and Systems, Jun. 2000, vol. J83-B, No. 6, pp. 845-851 (with partial English translation).

Kikuma, "Adaptive Antenna Technology", Oct. 2003, pp. 137-141 (with partial English translation).

(Continued)

*Primary Examiner* — Thomas Tarcza
*Assistant Examiner* — Matthew M Barker
(74) *Attorney, Agent, or Firm* — Nixon & Vanderhye PC

(57) ABSTRACT

In a radar with a non-uniformly spaced antenna array, an extractor estimates a number of arrivals of echoes to the antenna array. A setter sets a number of azimuths corresponding to a number of extracted peaks as a number of tested azimuths greater than the number of arrivals of echoes by a preset number. A determiner determines a level of correlations among steering vectors respectively corresponding to the tested azimuths. A selector selects, from the tested azimuths, azimuths as power-estimation targets based on the determined level of the correlations among the steering vectors. A first estimator estimates a received power level from each power-estimation target. A second estimator estimates, from the power-estimation targets, an azimuth of the target based on the estimated received power level from each power-estimation target. The estimated received power level from the azimuth is equal to or greater than a preset threshold level.

17 Claims, 16 Drawing Sheets

U.S. PATENT DOCUMENTS

| | | | |
|---|---|---|---|
| 7,898,465 B2* | 3/2011 | Yamano et al. | 342/70 |
| 2003/0020650 A1* | 1/2003 | Chevalier et al. | 342/378 |
| 2005/0046607 A1* | 3/2005 | Volman | 342/109 |
| 2006/0007036 A1 | 1/2006 | Natsume et al. | |

OTHER PUBLICATIONS

Sekine, "Radar Signal Processing Technique", Sep. 1991, pp. 96-97 (with partial English translation).

* cited by examiner

FIG.3
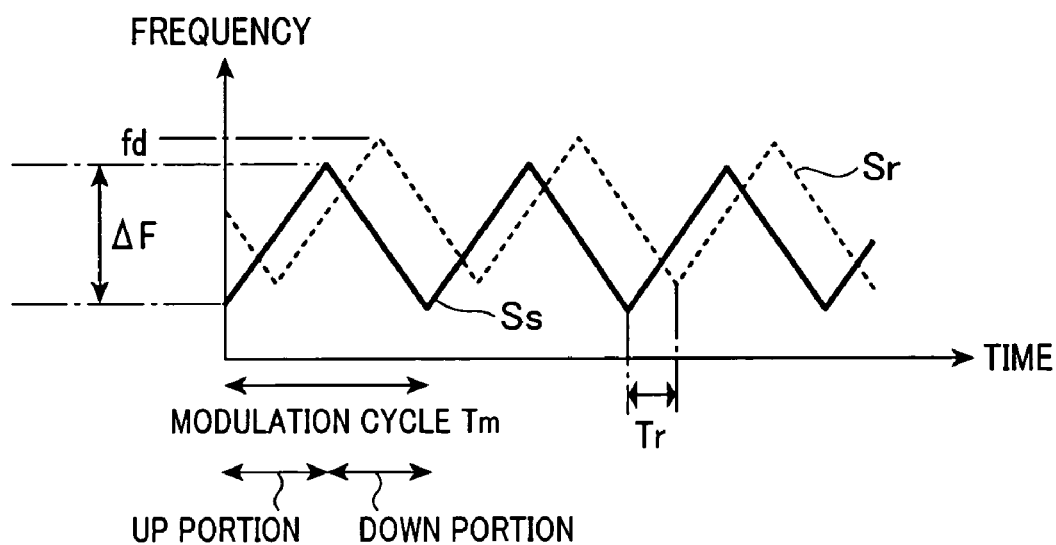
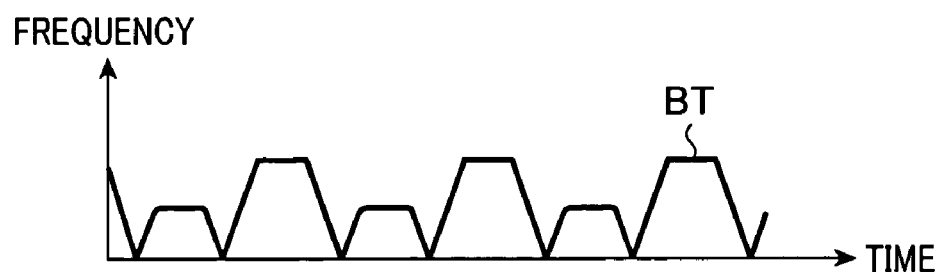

FIG.8A
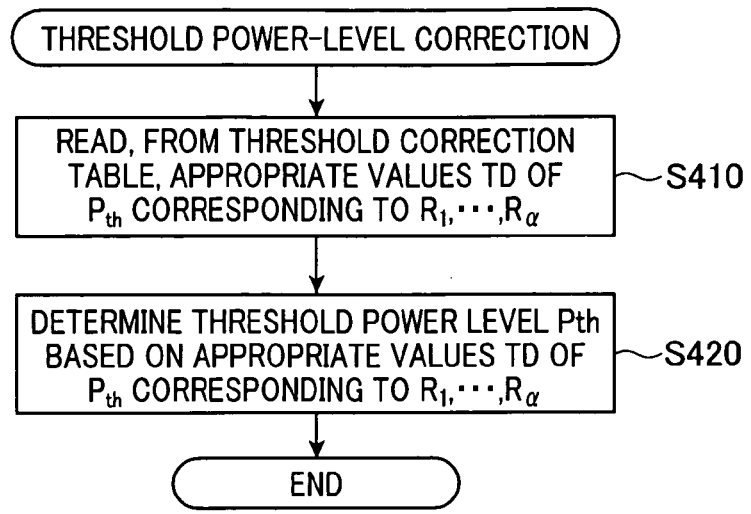
FIG.8B
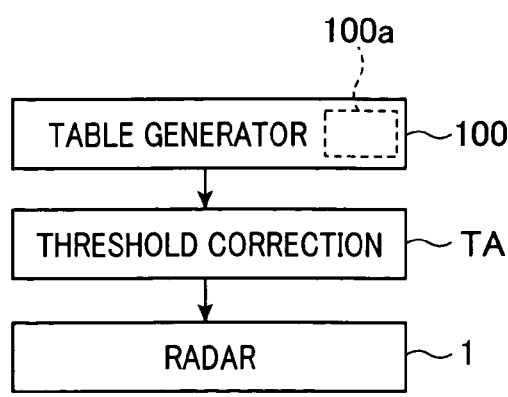
| TA | |
|---|---|
| $R_{min} \sim R_{min}+\Delta$ | APPROPRIATE VALUE TD [1] |
| $R_{min}+\Delta \sim R_{min}+2\Delta$ | APPROPRIATE VALUE TD [2] |
| $R_{min}+2\Delta \sim R_{min}+3\Delta$ | APPROPRIATE VALUE TD [3] |
| ... | ... |
| $R_{max}-\Delta \sim R_{max}$ | APPROPRIATE VALUE TD [Q] |
FIG.8C

| | TA1 |
|---|---|
| COMBINATION Θ[1] | TD[1] |
| COMBINATION Θ[2] | TD[2] |
| COMBINATION Θ[3] | TD[3] |
| ... | ... |
| COMBINATION Θ[Q] | TD[Q] |

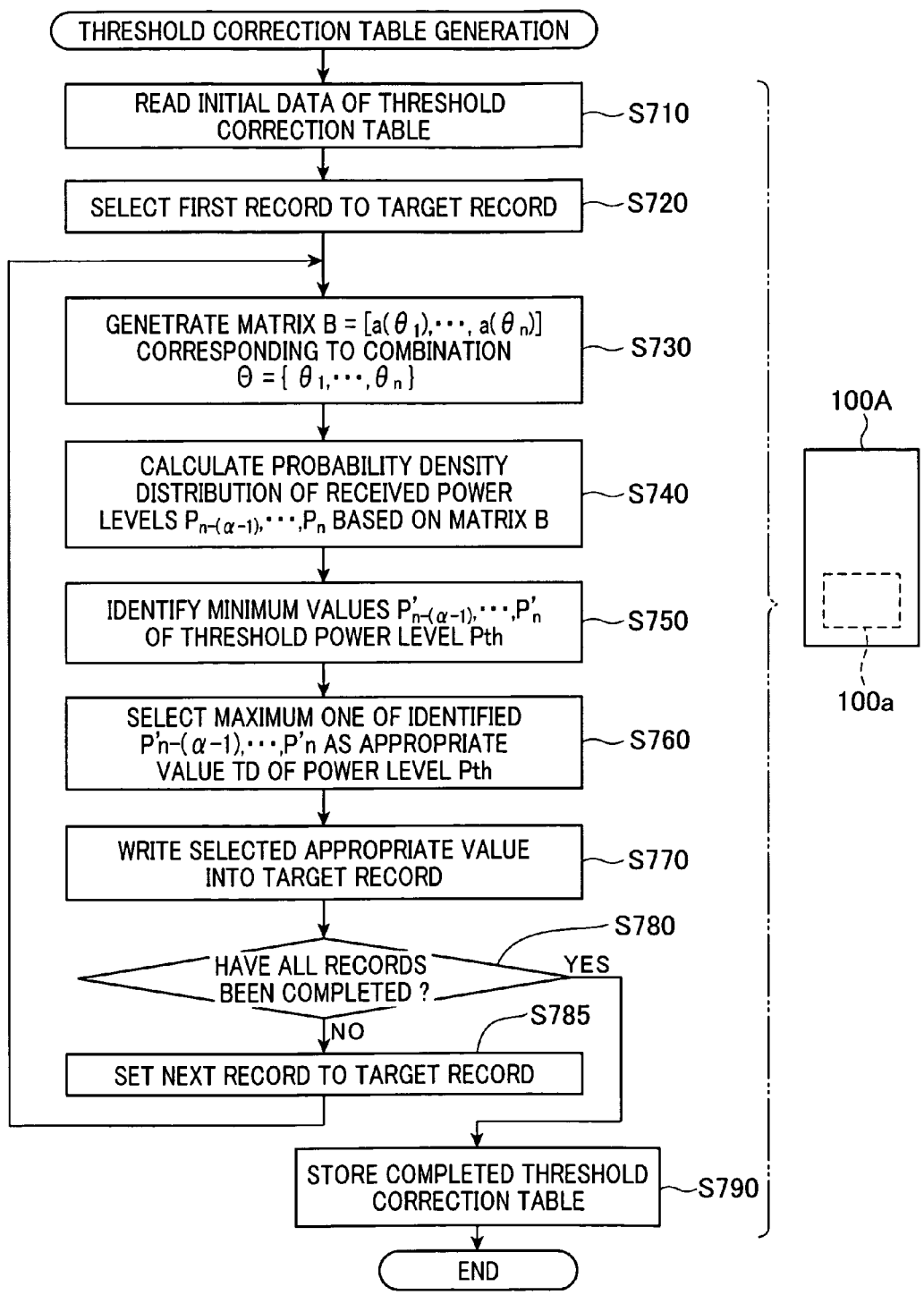

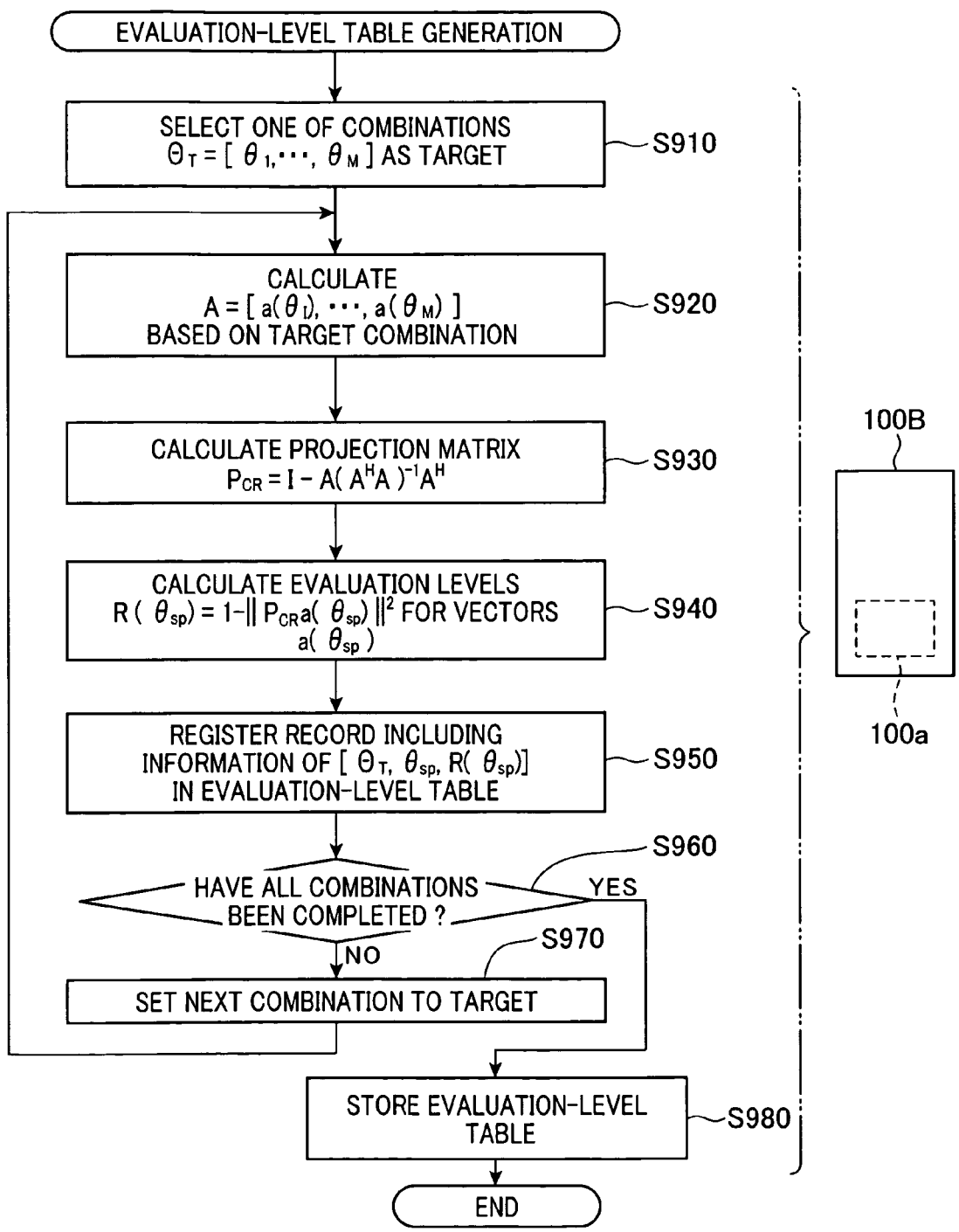

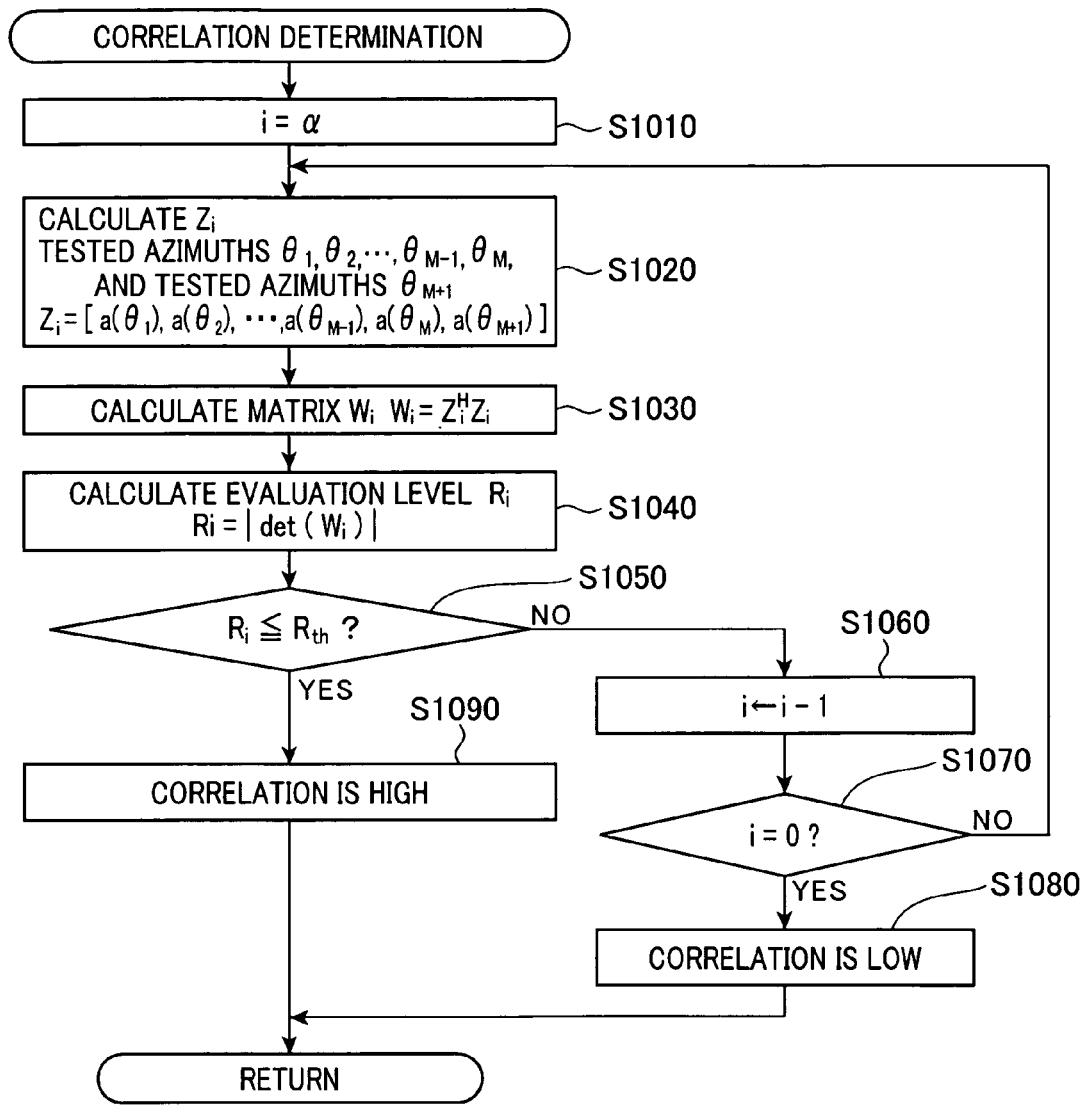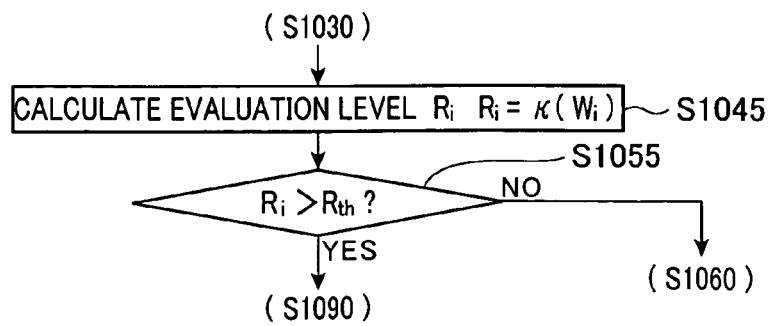

RADAR WITH NON-UNIFORMLY SPACED ANTENNA ARRAY

CROSS REFERENCE TO RELATED APPLICATIONS

This application is based on Japanese Patent Application 2008-193764 filed on Jul. 28, 2008. This application claims the benefit of priority from the Japanese Patent Application, so that the descriptions of which are all incorporated herein by reference.

FIELD OF THE INVENTION

The present invention relates to radars for transmitting radio waves, receiving echoes reflected from targets, and estimating, based on the received echoes, the directions of the targets in azimuth.

BACKGROUND OF THE INVENTION

Radars are widely used for motor vehicles. Specifically, such a radar installed in a motor vehicle works to emit radio waves from a transmitting antenna, receive, by a receiving antenna array, echoes reflected from targets. The receiving antenna array consists of a plurality of antennas in array.

The radar works to analyze the received echoes to thereby estimate the range to each target, the azimuth direction of each target with respect to the radar, and/or a relative speed between each target and the motor vehicle.

Specifically, the radar estimates the range to each target based on the time difference (delay) between the arrival of each echo and a corresponding transmitted radio wave. The radar also estimates the relative speed between each target and the radar based on the doppler shift in each echo with respect to a corresponding transmitted radio wave.

In addition, the radar estimates the direction of each target in azimuth based on the differences in phase among the echoes received by the antennal elements of the antenna array; these differences in phase among the echoes depend on their directions of arrival.

The MUSIC (Multiple Signal Classification) method, one of various methods for estimating the direction of a target in azimuth using a receiving antenna array, is frequently used. For example, the MUSIC method is disclosed in Japanese Patent Application Publications 2006-047282 and 2000-121716 and in Toshiyuki NAKAZAWA et al, "Estimating Angle of Arrival with Non-uniformly Spaced Array: IEICE Transactions on Information and Systems, "Vol. J83-B", "No. 6", "pp. 845-851". The literature of "Estimating Angle of Arrival with Non-uniformly Spaced Array" will be referred to as "nonpatent document" hereinafter.

The summary of the MUSIC method will be described hereinafter assuming that the antenna array consists of K antennas arranged in a linear array. For example, reference numeral 19 in FIG. 1 represents such an antenna array.

A signal of each of the K antennas based on arrival echoes received by the K antennas defines a received vector X as the following equation (1), and, from the equation (1), an autocorrelation mat Rxx with K rows and K columns represented as the following equation (2) is derived:

$$X(i) = [x_1(i), x_2(i), \ldots, x_k(i)]^T \quad (1)$$

$$Rxx = \frac{1}{L}\sum_{i=1}^{L} X(i)X^H(i) \quad (2)$$

where T represents transpose of vector, H represents transpose of complex conjugate, $x_k(i)$ as an element of the received vector X(i) (k=1, 2, ..., K) represents a value of the received signal of a k-th antenna at time i, and L represents the number of snapshots (samples) of the received vector X(i).

Specifically, the autocorrelation matrix Rxx is derived from the L snapshots of the received vector $x_k(i)$.

Thereafter, K eigenvalues $\lambda_1, \lambda_2, \ldots, \lambda_K$ of the autocorrelation matrix Rxx are obtained to meet the equation "$\lambda_1 \geq \lambda_2 \geq \ldots \geq \lambda_K$". A number M of arrival echoes is estimated in accordance with the following equation (2a):

$$\lambda_1 \geq \lambda_2 \geq \ldots \geq \lambda_M > \lambda_{th} \geq \lambda_{M+1} = \ldots = \lambda_K \quad (2a)$$

where $\lambda_{th}$ represents a threshold corresponding to thermal noise power $\sigma^2$. Note that a real value of the thermal noise power $\sigma^2$ is unclear, and therefore, the threshold $\lambda_{th}$ can be used as the thermal noise power $\sigma^2$. The average value of the eigenvalues $\lambda_{M+1}, \lambda_{M+2}, \ldots, \lambda_{M+K}$ can be used in place of the threshold $\lambda_{th}$.

In addition, (K−M) eigenvectors $e_{M+1}, e_{M+2}, \ldots e_K$ corresponding to the (K−M) eigenvalues $\lambda_{M+1}, \lambda_{M+2}, \ldots, \lambda_K$ are calculated. The (K−M) eigenvectors $e_{M+1}, e_{M+2}, \ldots e_K$ will be referred to as "noise eigenvector $E_N$" hereinafter (see the following equation (3)):

$$E_N = (e_{M+1}, e_{M+2}, \ldots, e_K) \quad (3)$$

When a complex response vector of the antenna array with respect to an azimuth parameter θ is defined as a steering vector α(θ) the following equation (3a) is established:

$$\alpha^H(\theta)E_N = 0 \quad (3a)$$

Note that the azimuth parameter θ represents an incident angle of an arrival echo with respect to a direction orthogonal to the receiving surface of the antenna array.

The equation (3a) represents that the noise eigenvector $E_N$ is orthogonal to the steering vector α(θ) when the steering vector α(θ) is directed to the azimuth of the arrival echoes.

From the equation (3a), a MUSIC spectrum, which is defined as "performance function $P_{MN}$" given by the following equation (4), is derived:

$$P_{MN} = \frac{1}{\sum_{i=M+1}^{K} |e_i^H a(\theta)|^2} \times a^H(\theta)a(\theta) \quad (4)$$

$$= \frac{a^H(\theta)a(\theta)}{a^H(\theta)E_N E_N^H a(\theta)}$$

The MUSIC spectrum defined by the equation (4) demonstrates that its shaper peaks at nulls appear when corresponding azimuths of the azimuth parameter θ are in agreement with the azimuths of the arrival echoes.

Thus, extraction of the peaks of the MUSIC spectrum obtains estimated azimuths $\theta_1, \ldots, \theta_M$ of the arrival radio waves, that is, estimated azimuths of targets that cause the echoes.

Note that the extracted peaks may include peaks due to noise components in addition to peaks caused by the echoes.

Thus, in order to estimate, with high accuracy, the directions of targets in azimuth, the estimated azimuths $\theta_1, \ldots, \theta_M$ of the arrival echoes extracted from the MUSIC spectrum are set as power estimation targets, and thereafter, received power levels $P_1, \ldots, P_M$ of the power estimation targets $\theta_1, \ldots, \theta_M$ are calculated.

At least one of the power estimation targets $\theta_1, \ldots, \theta_M$, the received power level of which is equal to or greater than a threshold power level $P_{th}$, is estimated as the azimuth of at least one real target. The direction of a noise component has a lower received power level. For this reason, estimation, as the azimuth of at least one target, of at least one of the power estimation targets $\theta_1, \ldots, \theta_M$, the received power level of which is equal to or greater than the threshold power level $P_{th}$, reduces improper estimations of the azimuths of the targets due to the noise components.

Specifically, the estimation of the received power levels $P_1, \ldots, P_M$ of the power estimation targets $\theta_1, \ldots, \theta_M$ will be carried out in accordance with the following steps.

First, a steering matrix A is generated based on the steering vectors $\alpha(\theta_1), \ldots, \alpha(\theta_M)$ corresponding to the power estimation targets $\theta_1, \ldots, \theta_M$ is generated (see the following equation (5)):

$$A=[\alpha(\theta_1),\alpha(\theta_2),\ldots,\alpha(\theta_{M-1}),\alpha(\theta_M)] \quad (5)$$

Based on the steering matrix A, a matrix S represented by the following equation (6) is calculated:

$$S=(A^H A)^{-1} A^H (Rxx - \sigma^2 I) A (A^H A)^{-1} \quad (6)$$

where I represents a unit matrix, and $\sigma^2$ represents the thermal noise power.

From the m diagonal components in the equation (6), the received power levels $P_m$ of the power estimation targets $\theta_m$ (m=1, 2, ..., M) is derived (see the following equation (7)):

$$[P_1, P_2, \ldots, P_{M-1}, P_M] = \mathrm{diag}(S) \quad (7)$$

where diag(f) represents the diagonal components of a given matrix f.

As described above, at least one of the power estimation targets $\theta_1, \ldots, \theta_M$, the received power level of which is equal to or greater than the threshold power level $P_{th}$, is estimated as the azimuth of at least one real target.

The estimation of the azimuths of targets based on the MUSIC method normally uses a receiving antenna array consisting of a plurality of uniformly spaced antennas; this type of antenna arrays will be referred to as 'uniformly spaced antenna array' hereinafter.

In the uniformly spaced antenna array using the MUSIC method set fort above, the difference of $2n\pi$ (n is an integer) in phase between actual arrival echoes received by adjacent antennas cyclically causes grating lobes.

That is, a space spanned by steering vectors indicating given azimuths of actual arrival echoes with respect to the uniformly spaced antenna array include steering vectors indicating azimuths of the generated grating lobes.

Thus, it is necessary to determine a scanning azimuth range of the uniformly spaced antenna array so as to prevent detection of the grating lobes; this scanning azimuth range will be also referred to as "field of view (FOV)" hereinafter. In other words, it is necessary to uniformly narrow the spaces between adjacent antennas of the uniformly spaced antenna array. The narrowing of the antenna-array spaces widens the FOV of the uniformly spaced antenna array.

However, because the azimuth resolution of the uniformly spaced antenna array is determined by the length of the aperture thereof to maintain high the azimuth resolution of the uniformly spaced antenna array with the FOV being wide contributes to an increase in the number of antennas; this results in an increase in the cost of the uniformly spaced antenna array.

In addition, it may be difficult to narrow the spaces between adjacent antennas of the uniformly spaced antenna array because the narrowing causes the number of antennas and mutual coupling between the antennas to increase.

In view of the foregoing problems, the nonpatent document discloses a non-uniformly spaced antenna array consisting of a plurality of non-uniformly spaced antennas. The proper setting of non-uniform spaces between adjacent antennas of the non-uniformly spaced antenna array allows determination of whether a steering vector in a given azimuth with a required FOV under the estimated number of arrival echoes is included in spaces spanned by steering vectors indicating given azimuths of actual arrival echoes.

These non-uniformly spaced antenna arrays with a plurality of proper unequal spaced antennas, which employ the MUSIC method, increase its FOV as compared with uniformly spaced antenna arrays set forth above.

Specifically, the nonpatent document focuses on the linear independence between steering vectors $A\{\alpha(\theta_1), \ldots, \alpha(\theta_M)\}$ corresponding to given azimuths $\theta_1, \ldots, \theta_M$ and a given steering vector $\alpha(\theta_S)$ with a required FOV. Guaranteeing the linear independence between the steering vectors $A\{\alpha(\theta_1), \ldots, \alpha(\theta_M)\}$ and the steering vector $\alpha(\theta_S)$ guarantees that the steering vector $\alpha(\theta_S)$ is not included in the spaces spanned by the steering vectors indicating azimuths of actual arrival echoes when the number of the actual arrival echoes is equal to or lower than M.

When the linear independence between the arrival-azimuth steering vectors $A\{\alpha(\theta_1), \ldots, \alpha(\theta_M)\}$ and the given steering vector $\alpha(\theta_S)$ becomes low, the given steering vector $\alpha(\theta_S)$ is represented by the following equation (7a):

$$a(\theta_S) = \sum_{m=1}^{M} c_m a(\theta_m) + r \quad (7a)$$

where r represents a given vector ($|r| \neq 0, |r| \ll 1$), and $c_m$ is a given complex number.

The reduction in the linear independence between the arrival-azimuth steering vectors $A\{\alpha(\theta_1), \ldots, \alpha(\theta_M)\}$ and the given steering vector $\alpha(\theta_S)$ may cause peaks of the MUSIC spectrum to appear in azimuths $\theta_S$ corresponding to the steering vector $\alpha(\theta_S)$.

Note that, in the specification, ambiguity peaks of the MUSIC spectrum that are not due to noise and are not caused by arrival echoes based on transmitted radio waves will be expressed as 'undesired peaks' hereinafter. In contrast, peas caused by arrival echoes based on transmitted radio waves will be referred to as "desired peaks" hereinafter.

In addition, the fact that the L2 norm of the vector r in the equation (6), expressed by "$\sqrt{|r|^2}$", is lower than a preset value means that the linear independence between the arrival-azimuth steering vectors and given steering vectors is weak (low). Similarly, the fact that the L2 norm of the vector r in the equation (6) is higher than the preset value means that the linear independence between the arrival-azimuth steering vectors and the given steering vectors is strong (high).

More specifically, in radars equipped with such a non-uniformly spaced antenna array, not only appear desired peaks, but also appear peaks due to noise and undesired peaks. In these radars, the number M of arrival echoes is designed to be estimated, independently of the linear independence between the arrival-azimuth steering vectors and given steering vectors, with an accuracy identical to that obtained by radars equipped with a uniformly spaced antenna array.

Thus, in these radars equipped with a non-uniformly spaced antenna array, when azimuths of power estimation targets corresponding to the number M of the arrival echoes are selected form the MUSIC spectrum, azimuths corresponding to desired peaks may not be selected, but those corresponding to undesired peaks may be erroneously selected.

When a received power level of a power estimation target corresponding to an undesired peak is calculated set forth above, the calculated received power level may be high because of the weakness of the linearly independence between the arrival-azimuth steering vectors and given steering vectors.

For this reason, unlike the received power level of a power estimation target corresponding to a peak due to noise, the comparison between the received power level of a power estimation target corresponding to an undesired peak and the threshold power level $P_{th}$ cannot eliminate the power estimation target corresponding to the undesired peak. This results in that azimuths in which there are no targets may be erroneously estimated as the azimuths of real targets.

For example, it is assumed that a MUSIC spectrum of received signals of a non-uniformly antenna array illustrated in FIG. 17A is obtained. The MUSIC spectrum has three peaks corresponding to three azimuths $\theta_1$, $\theta_2$, and $\theta_3$.

In this assumptions when no undesired peaks are contained in the MUSIC spectrum and the peak at the azimuth $\theta_3$ is due to noise, estimation of received power levels P1, P2, and P3 corresponding to the three azimuths θ1, θ2, and θ3 allows the azimuth θ3 due to noise to be definitely separated from the azimuths θ1 and θ2 of real targets. This is because the received power level P3 is clearly distinguished from the received power levels P1 and P2 based on the threshold power level $P_{th}$ (see FIG. 17B).

In contrast, when one undesired peak at the azimuth θ3 is contained in the MUSIC spectrum, even if received power levels P1, P2, and P3 corresponding to the three azimuths θ1, θ2, and θ3 are estimated, it is difficult to separate the azimuth θ3 corresponding to the undesired peak from the azimuths θ1 and θ2 of real targets. This is because there are no clear differences between the received power levels P1 to P3 (see FIG. 17C).

In summary, conventional radars equipped with a non-uniformly spaced antenna array in place of a uniformly spaced antenna array may increase the possibility of erroneously estimating azimuths of targets due to undesired peaks, thus deteriorating the estimation accuracy of azimuths of targets.

BRIEF SUMMARY

In view of the circumstances set forth above, one aspect of the present exemplary embodiment is to provide radars with a non-uniformly spaced antenna array; these radars are adapted to estate, while reducing the effects of undesired peaks, azimuths of targets with high accuracy.

According to one aspect of the present exemplary embodiment, there is provided a radar for transmitting, via a transmitting antenna, a radio wave. The radar includes an antenna array made up of a plurality of antennas arranged at non-uniformly spaced intervals. The antenna array works to receive echoes reflected from a target based on the transmitted radio waves so that each of the plurality of antennas obtains a received signal. The radar includes a correlation matrix generator working to generate, based on the received signals of the plurality of antennas, an autocorrelation matrix for the received signals. The radar includes an eigenvalue calculator working to calculate a plurality of eigenvalues of the autocorrelation matrix, and an extractor working to estimate a number of arrivals of echoes to the antenna array based on the plurality of eigenvalues of the autocorrelation matrix. The extractor works to extract, from a plurality of eigenvectors respectively corresponding to the plurality of eigenvalues, at least one eigenvector corresponding to a noise component. The radar includes a spectrum calculator working to calculate a MUSIC spectrum based on the at least one eigenvector, and a tested azimuth setter working to extract, from the MUSIC spectrum, a number of peaks. The tested azimuth setter works to set a number of azimuths corresponding to the number of extracted peaks as a number of tested azimuths. The number of tested azimuths is greater than the number of arrivals of echoes by a preset number. The radar includes a determiner working to determine a level of correlations among a number of steering vectors respectively corresponding to the number of tested azimuths. The radar includes a power-estimation target selector working to select, from the number of tested azimuths, a number of azimuths as power-estimation targets based on the determined level of the correlations among the number of steering vectors. The radar includes a first estimator working to estimate a received power level from each of the power-estimation targets. The radar includes a second estimator working to estimate, from the power-estimation targets, an azimuth of the target based on the estimated received power level from each of the power-estimation targets, the estimated received power level from the azimuth estimated by the second estimator being equal to or greater than a preset threshold level.

BRIEF DESCRIPTION OF THE DRAWINGS

Other objects and aspects of the invention will become apparent from the following description of embodiments with reference to the accompanying drawings in which:

FIG. 3 is graphs, one of which illustrates changes in a transmission signal and an echo signal over time, the other of which illustrates changes in a beat signal Over time according to the first embodiment

FIG. 8A is a flowchart schematically illustrating a threshold power-level correction subroutine to be called in the target-azimuth estimation routine according to the first embodiment;

FIG. 8B is a view schematically illustrating an example of the configuration of a threshold correction table installed in the signal processor according to the first embodiment;

FIG. 8C is a block diagram schematically illustrating the transfer of the threshold correction table between the radar and a table generator according to the first embodiment;

FIG. 11 is a flowchart schematically illustrating a threshold correction table generating routine to be executed by a table generator illustrated therein;

FIG. 13 is a flowchart schematically illustrating a threshold correction table generating routine to be executed by a table generator illustrated therein;

FIG. 15A is a flowchart schematically illustrating a correlation determination subroutine to be called in the target-azimuth estimation routine according to a fifth embodiment of the present invention;

FIG. 15B is a flowchart schematically illustrating a correlation determination subroutine to be called in the target-azimuth estimation routine according to a modification of the fifth embodiment of the present invention;

DETAILED DESCRIPTION OF EXEMPLARY EMBODIMENTS

Figure 1:
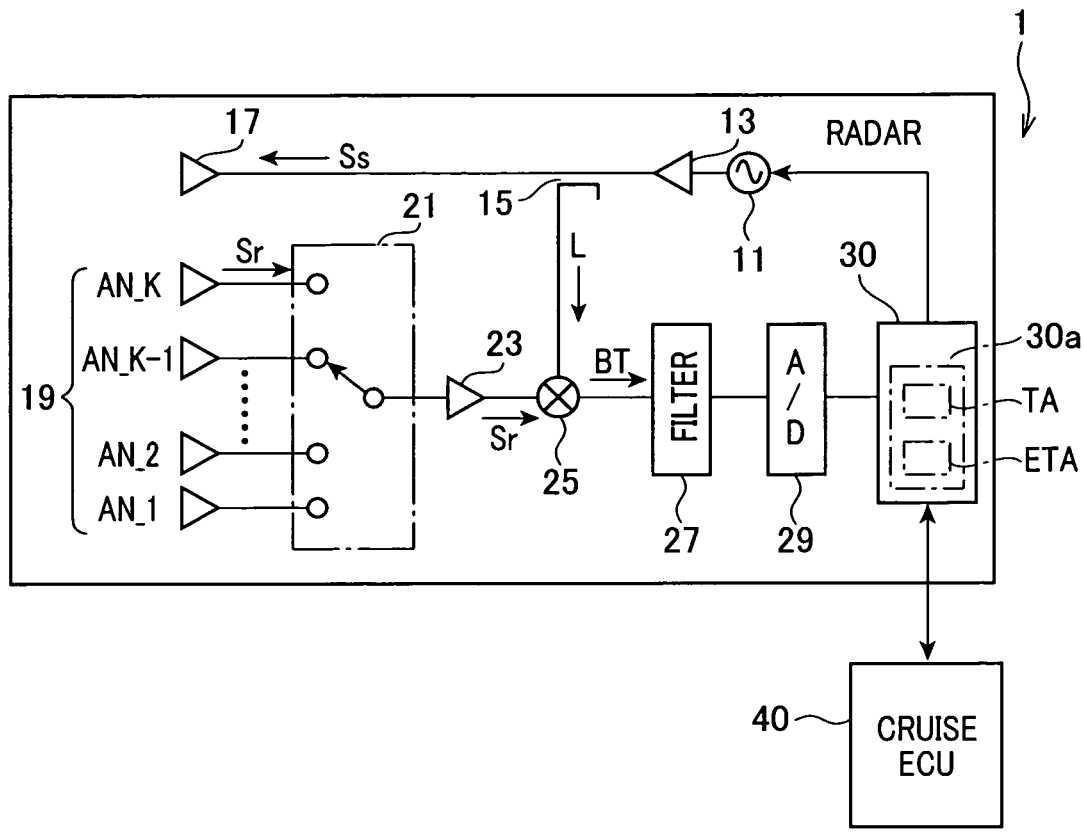
FIG. 1 is a block diagram schematically illustrating an example of the structure of a radar according to the first embodiment of the present invention.

Embodiments of the present invention will be described hereinafter with reference to the accompanying drawings. In the drawings, identical reference characters are utilized to identify identical corresponding components.

First Embodiment

Referring to FIG. 1, there is illustrated a radar 1 according to the first embodiment of the present invention. In the first embodiment, the radar 1 is installed in a motor vehicle and mounted on, for example, the front end of the motor vehicle.

The radar 1 is designed as an FMCW (Frequency-Modulated Continuous-Wave) radar. Specifically, the radar 1 is provided with an oscillator 11, an amplifier 13, a distributor 15, a transmitting antenna 17, and a receiving antenna array 19.

The oscillator 11 works to generate, based on a triangular modulation voltage signal, a millimeter high-frequency signal; the frequency of the millimeter high-frequency signal is linearly changed, within a preset frequency range $\Delta F$, in a positive sense (up chirp) and a negative sense (down chirp) over time with a preset modulation cycle Cm.

The amplifier 13 works to amplify the millimeter high-frequency signal generated by the oscillator 11.

The distributor 15 works to distribute the millimeter high-frequency signal amplified by the amplifier 13 into a positively and negatively chirped transmission signal Ss (see FIG. 3) and a local signal L.

The transmitting antenna 17 works to radiate a positively and negatively chirped millimeter radio wave based on the positively and negatively chirped transmission signal Ss in front of the motor vehicle.

The receiving antenna array, referred to simply as "antenna array", 19 consists of K antennas (K channels; K is an integer equal to or greater than 2), and works to receive, by its receiving surface, echoes reflected from targets in front of the motor vehicle based on the transmitted radio waves.

The radar 1 is also provided with a receiving switch 21, an amplifier 23, a mixer 25, a filter 27, an A/D (Analog-to-Digital) converter 29, and a signal processor (processor) 30.

The receiving switch 21 works to select any one of the K antennas, and to supply, to the amplifier 23, an echo signal Sr sent from a selected one of the antennas; this echo signal Sr is generated based on an echo received by the selected one of the antennas.

The amplifier 23 works to amplify the echo signal Sr supplied from the selected one of the antennas.

The mixer 25 works to mix the echo signal Sr with the distributed local signal L to thereby produce a beat signal BT with a frequency corresponding to the difference in frequency between the echo signal Sr and the corresponding transmission signal Ss.

The filter 27 works to eliminate undesired signal components contained in the beat signal BT.

The A/D converter 29 works to sample the amplified and filtered beat signal BT to thereby convert the amplified and filtered beat signal BT into digital data, and to output the produced digital data to the signal processor 30.

The signal processor 30 is made up of, for example, a microcomputer with a memory unit 30a, and communicably coupled to the oscillator 11 and an external cruise control ECU 40 installed in the motor vehicle.

The memory unit 30a consists of at least one volatile memory and at least one removable nonvolatile memory installed in the signal processor 30. In the at least one nonvolatile memory of the memory unit 30a, a threshold correction table TA is stored. Information of the threshold correction table TA can be stored in the at least one nonvolatile memory of the memory unit 30a in program format. The information stored in the threshold correction table TA will be described hereinafter.

The signal processor 30 works to cause the oscillator 11 to start the signal generating operations and cause the oscillator 11 to stop them.

The signal processor 30 is programmed to subject the sampled digital data of the beat signal BT to predetermined signal processing to thereby achieve target information for example including: the range to each target, the azimuth of each target with respect to the radar, a relative speed between each target and the motor vehicle, and the like. The signal processor 30 is also programmed to send, to the cruise control ECU 40, the achieved information.

The antenna array 19 is designed such that the K antennas AN_1, AN_2, . . . , AN_K are arranged in a linear array at non-uniformly spaced intervals. Any one of the K antennas AN_1, AN_2, . . . , AN_K is represented by AN_i.

The subscript i represents any one of 1, 2, 3, . . . , K.

Figure 2:
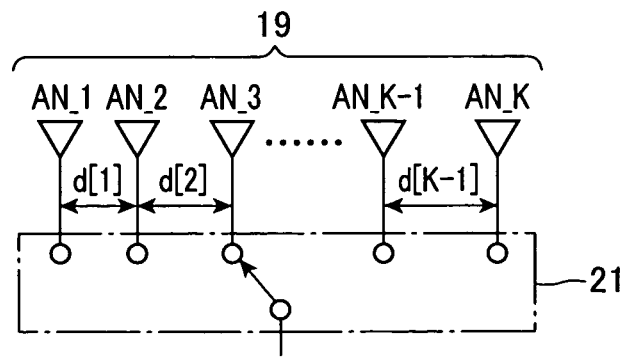
FIG. 2 is a circuit diagram schematically illustrating an example of the structure of an antenna array and a receiving switch illustrated in FIG. 1.

Referring to FIG. 2, the antenna array 19 is designed such that, when a space between the i-th element AN_i and the (i+1)-th element AN_i+1 is represented by d[i], at least one of spaces d[1], d[2], . . . , d[K−1] is different from another one of the spaces d[1], d[2], . . . , d[K−1]. Note that the design of the antenna array 19 permits only one of the spaces d[1], d[2], . . . , d[K−1] to be different from each of the remaining spaces, and permits all of the spaces d[1], d[2], . . . , d[K−1] to be different from each other.

With the configuration of the radar 1, the oscillator 11 activated by the signal processor 30 generates a millimeter high-frequency signal. The high-frequency signal generated by the oscillator 11 is amplified by the amplifier 13, and thereafter inputted to the distributor 15. The high-frequency signal is distributed by the distributor 15 so that the positively and negatively chirped transmission signal Ss and the local signal L are generated. The positively and negatively chirped transmission signal Ss is transmitted as the positively and negatively chirped millimeter radio wave by the transmitting antenna 17 in front of the motor vehicle.

An echo reflected by each target based on the transmitted radio wave is returned to the radar 1, and received by each antenna of the antenna array 19. An echo signal Sr based on the corresponding received echo is outputted from each antenna to the receiving switch 21.

From the echo signals Sr sent from the antennas AN_1, AN_2, . . . , AN_K and received by the receiving switch 21, the echo signal Sr sent from the i-th receiving element AN_i is selected by the receiving switch 21 to be inputted to the amplifier 23. The selected echo signal Sr amplified by the amplifier 23 is supplied to the mixer 25.

The selected echo signal Sr inputted to the mixer 25 is mixed with the distributed local signal L so that the beat signal BT based on the difference in frequency between the echo signal Sr and the corresponding transmission signal Ss is generated (see FIG. 3). After undesired signal components have been eliminated therefrom by the filter 27, the beat signal BT is sampled by the A/D converter 29 as digital data, and thereafter, the sampled digital data is inputted to the signal processor 30.

The receiving switch 21 switches the selection of any one of the antennas AN_1, AN_2, . . . , AN_K such that a preset number of selections of each of the antennas AN_1, AN_2, . . . , AN_K are carried out within one modulation cycle of the transmitted radio wave. The A/D converter 29 samples the beat signal BT in synchronization with every switching timing of the antennal-element selection by the receiving antenna 21.

Thus, the sampled data of each cycle of the beat signal BT for each channel (antenna) of the antenna array 19 is captured to be stored in the signal processor 30.

The signal processor 30 is programmed to analyze the sampled data of each cycle (up portion and down portion) of the beat signal BT for each channel of the antenna array 19. For example, the signal processor 30 is programmed to carry out a fast Fourier transform (FFT) based on the sampled data of each cycle (up portion and down portion) of the beat signal BT for each channel of the antenna array 19. This achieves the target information based on the result of the analyzing.

For example, the target information includes: the distance to each target, the azimuth of each target with respect to the radar, a relative speed between each target and the motor vehicle, and the like. The signal processor 30 is also programmed to send, to the cruise control ECU 40, the achieved information.

Specifically, when the receiving antenna 19 receives an echo caused by the radio wave transmitted from the transmitting antenna 17 based on the transmission signal Ss, the echo signal Sr based on the received echo is delayed by a time Tr (see dashed line in FIG. 3). The delay time Tr is defined as a time elapsed between the transmitting of the radio wave and the receiving of the corresponding echo, this delay time Tr depends on a distance of a corresponding target.

In addition, the echo signal Sr is shifted up or down by a frequency fd; This frequency (doppler frequency) fd changes with change in the relative speed between the corresponding target and the motor vehicle (radar 1).

That is, the signal processor 30 is programmed to estimate, based on the delay time Tr and the doppler frequency fd contained in each cycle of the beat signal BT for each channel the distance to the corresponding target and the relative speed between the corresponding target and the motor vehicle.

Figure 4A:
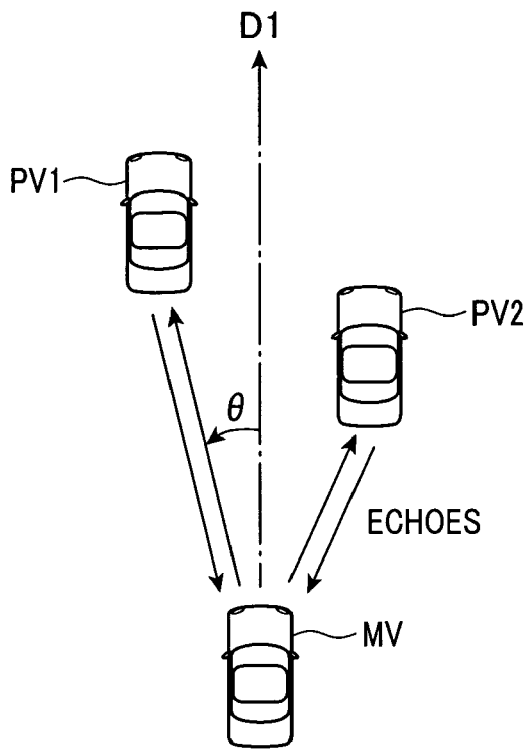
FIG. 4A is a view schematically illustrating azimuths of two targets with respect to a motor vehicle in which the radar is installed according to the first embodiment.

The signal processor 30 is also programmed to estimate, based on the MUSIC method, directions of targets in azimuth relative to a driving direction D1 (see FIG. 4A) of the motor vehicle corresponding to a direction orthogonal to the receiving surface of the antenna array 19.

As described above, the MUSIC method is designed to estimate the directions of arrivals of echoes based on differences in phase between the antennas AN_1, AN_2, AN_K.

Figure 4B:
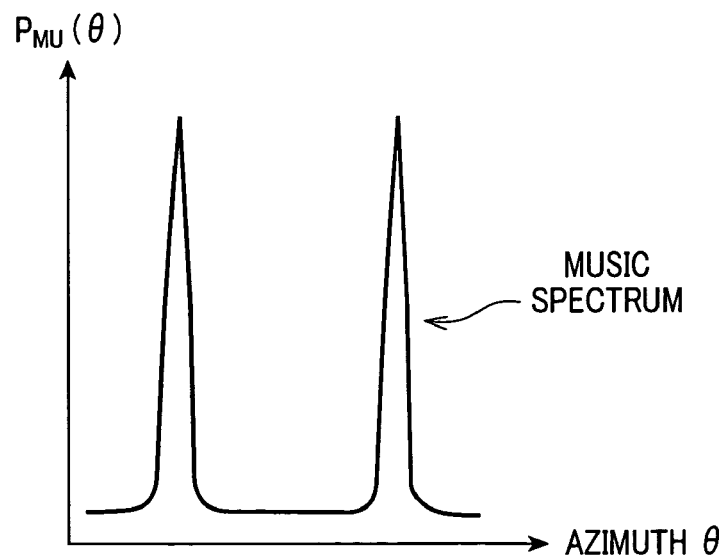
FIG. 4B is a graph schematically illustrating shaper peaks appearing in a MUSIC spectrum obtained by the radar at azimuths of the two targets illustrated in FIG. 4A.

For example, it is assumed that two targets (preceding vehicles) PV1 and PV2 are running in front of the running motor vehicle in which the radar 1 is installed (see FIG. 4A); this motor vehicle is illustrated by MV. In this assumption, a MUSIC spectrum calculated based on the sampled data of the beat signal BT by the A/D converter 29 demonstrates that its sharper peas appears when corresponding azimuths of the azimuth parameter θ are in agreement with the azimuths of the preceding vehicles PV1 and PV2 relative to the driving direction of the motor vehicle (see FIG. 4B).

The signal processor 30 according to the first embodiment is programmed to:

estimate received power levels of estimated azimuths corresponding to peaks of the MUSIC spectrum; and when at least one of the estimated received power levels is equal to or greater than a threshold power level $P_{th}$, estimate, as the azimuth of at least one target, at least one estimated azimuth corresponding to the at least one of the estimated received power levels.

Because the receiving antenna 19 is designed such that the K antennas AN_1, AN_2, . . . , AN_K are arranged in a linear array at non-uniformly spaced intervals, the MUSIC spectrum has three types of peaks: the first type of peaks (desired peaks) caused by arrival echoes, the second type of peaks due to noise components, and the third type of peaks (undesired peaks) except for the first and second types of peaks.

Figure 5:
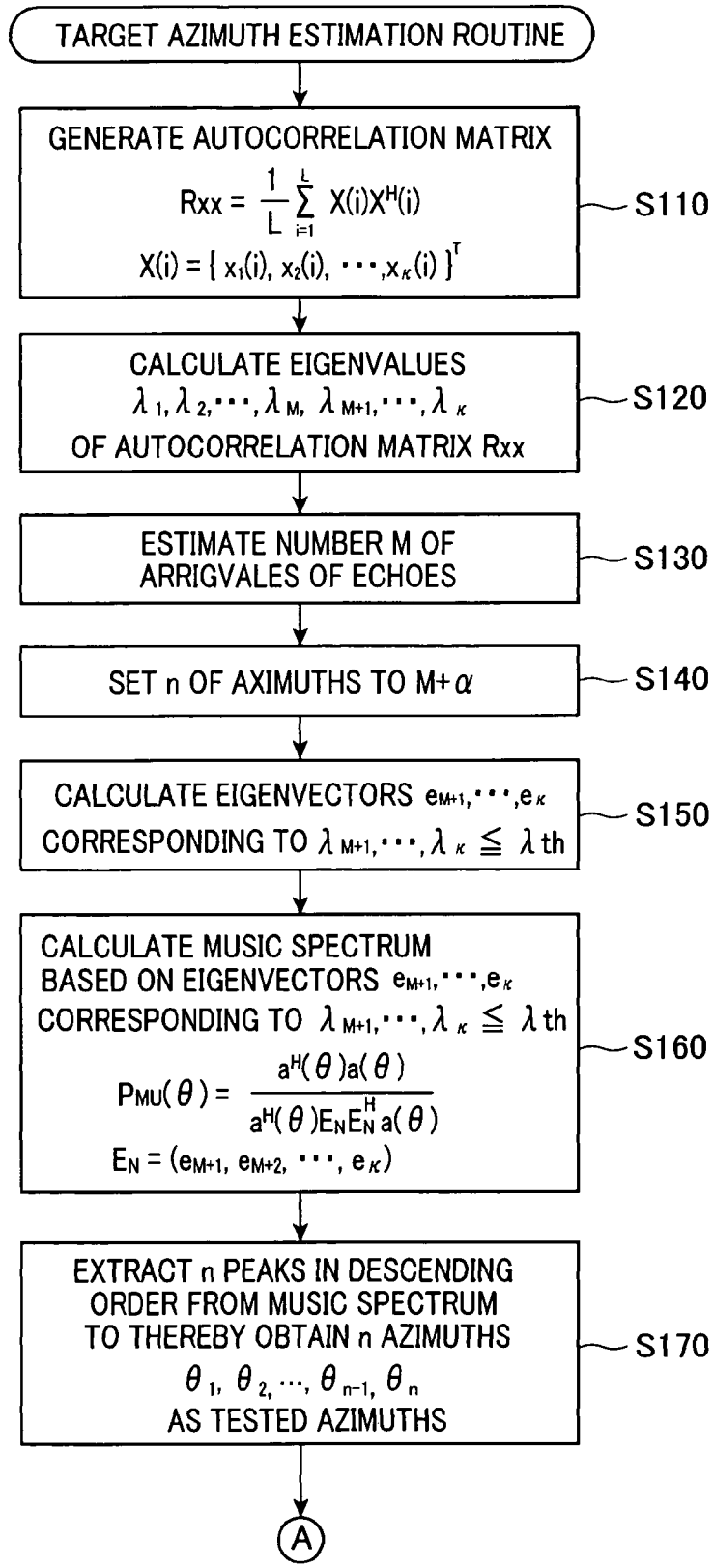
FIG. 5 is a flowchart schematically illustrating one part of a target-azimuth estimation routine to be executed by a signal processor illustrated in FIG. 1 according to the first embodiment.
Figure 6:
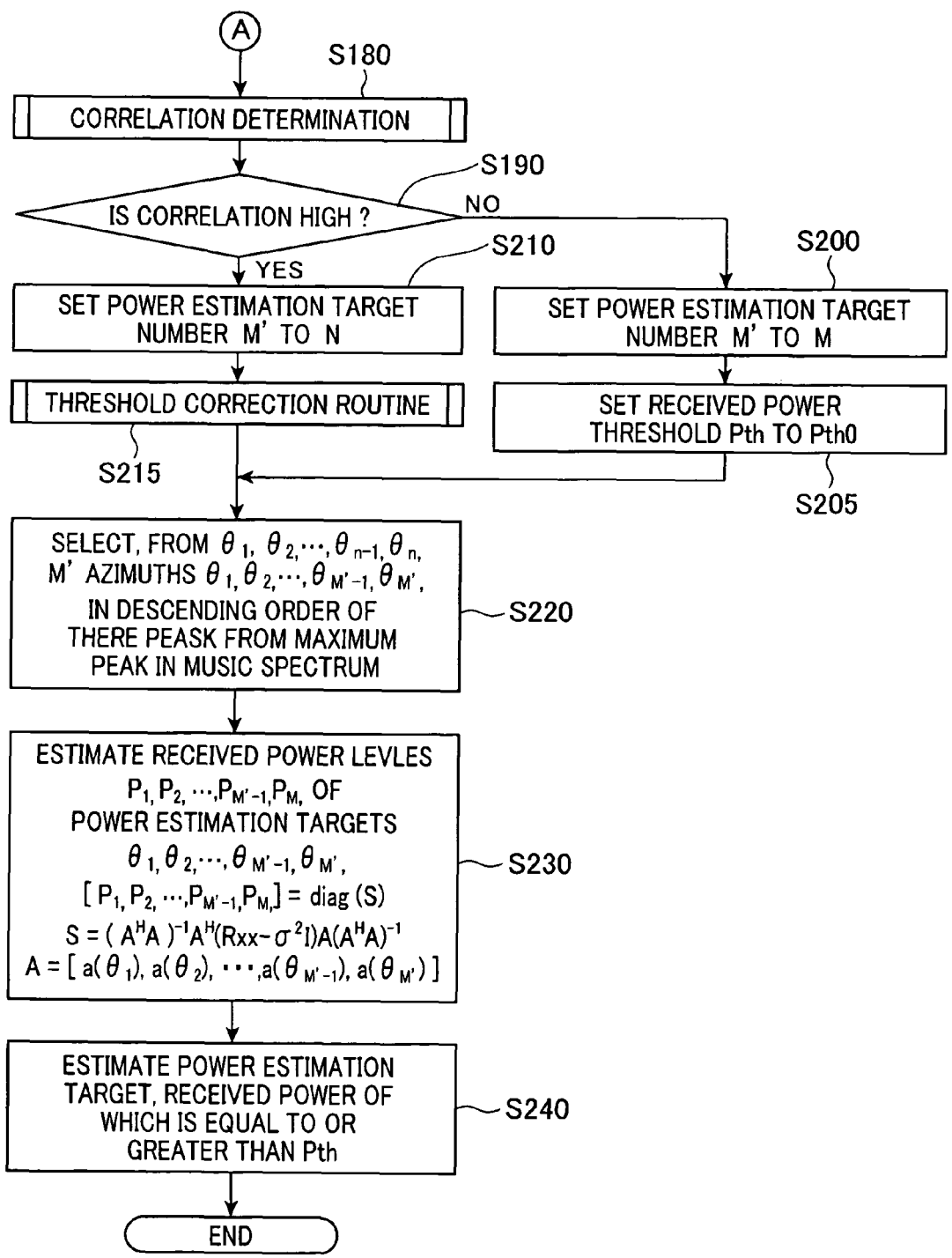
FIG. 6 is a flowchart schematically illustrating the remaining part of the target-azimuth estimation routine to be executed by the signal processor according to the first embodiment.

Thus, the signal processor 30 according to the first embodiment is specially programmed to carry out a target-azimuth estimation routine illustrated in FIGS. 5 and 6 to thereby estimate the azimuth of at least one target while reducing the adverse effects of undesired peaks. For examples the signal processor 30 is programmed to start the target-azimuth estimation routine every time a preset number (snapshots) of cycles of the sampled data of the beat signal BT for each channel are inputted to be stored therein.

When starting the target-azimuth estimation routine, the signal processor 30 generates, for example, using the FFT set forth above, an autocorrelation matrix Rxx with K rows and K columns in accordance with the equations (1) and (2) set forth above in step S110.

Note that a signal of each of the K antennas AN_1, AN_2, ..., AN_K based on arrival echoes received thereby defines a received vector X as the following equation (1). $x_k(i)$ as an element of the received vector $X(i)$ (k=1, 2, ..., K) represents a value of the received signal of a k-th antenna at time i; this k-th antenna is specified based on the sampled data of the corresponding beat signal BT. L represents the number of snapshots of the received vector X(i).

Thereafter, the signal processor 30 calculates K eigenvalues $\lambda_1, \lambda_2, \ldots, \lambda_K$ of the autocorrelation matrix Rxx so as to meet the equation "$\lambda_1 \geq \lambda_2 \geq \ldots \geq \lambda_K$" in step S120. Next, the signal processor 30 estimates, as the number M of arrivals of echoes, a number of eigenvalues in the K eigenvalues $\lambda_1, \lambda_2, \ldots, \lambda_K$ that is greater than the threshold $\lambda_{th}$ corresponding to the noise power $\sigma^2$ set forth above in step S130.

That is, in step S130, the number M of arrivals of echoes corresponding to the number of eigenvalues $\lambda_1, \lambda_2, \ldots, \lambda_M$ greater than the threshold $\lambda_{th}$ is estimated.

After the estimation of the number M of arrivals of echoes, the signal processor 30 sets a number n of azimuths to be extracted as tested azimuths from a MUSIC spectrum by adding a preset number α to the number M of arrivals of echoes in the following equation in step S140:

$$n = M + \alpha$$

After the completion of the operation in step S140, the signal processor 30 calculates (K−M) eigenvectors $e_{M+1}, e_{M+2}, \ldots, e_K$ corresponding to the (K−M) eigenvalues $\lambda_{M+1}, \lambda_{M+2}, \ldots, \lambda_K$ that are equal to or lower than the threshold $\lambda_{th}$ in step S150. The (K−M) eigenvectors $e_{M+1}, e_{M+2}, \ldots, e_K$ are defined as "noise eigenvector $E_N$" of noise components (see FIG. 3), the (K−M) eigenvalues $\lambda_{M+1}, \lambda_{M+2}, \ldots, \lambda_K$ of which are equal to or lower than the thermal noise power $\pi^2$.

From the relationship between the noise eigenvector $E_N$, a complex response vector of the antenna array 19 with respect to an azimuth parameter θ defined as a steering vector α(θ) (see the equation (3)), the signal processor 30 derives a MUSIC spectrum defined as a performance function $P_{MN}$ given by the equation (4) set forth above in step S160.

Next, the signal processor 30 extracts one peak from the MUSIC spectrum such that an azimuth θ1 corresponding to the extracted one peak is the greatest in all azimuths corresponding to all peaks in the MUSIC spectrum, and subsequently extracts (n−1) peaks from the MUSIC spectrum in a descending order of value in step S170. Based on the extracted n peaks, the signal processor 30 obtains an azimuth corresponding to the one greatest peak, and (n−1) azimuths $\theta_2, \ldots, \theta_n$ respectively corresponding to the sequentially extracted peaks in step S170.

In step S170, the signal processor 30 sets the obtained n azimuths $\theta_1, \ldots, \theta_n$ as the tested azimuths.

Next, the signal processor 30 executes a correlation determination subroutine among the tested azimuths $\theta_1, \ldots, \theta_n$ in step S180.

For example in step S180, the signal processor 30 determines whether the level of the correlations among steering vectors $\alpha(\theta_1), \ldots, \alpha(\theta_n)$ corresponding to the tested azimuths $\theta_1, \ldots, \theta_n$ is high or low. Based on the determination, the signal processor 30 determines whether criteria azimuths $\theta_{M+1}, \ldots, \theta_n$ of the tested azimuths $\theta_1, \ldots, \theta_n$ includes at least one azimuth corresponding to at least one undesired peak. The correlation determination in step S180 will be described in detail hereinafter.

Upon determining that the level of the correlations among the steering vectors $\alpha(\theta_1), \ldots, \alpha(\theta_n)$ is high (YES in step S180), the signal processor 30 proceeds to step S210, Otherwise (NO in step S180), the signal processor 30 proceeds to step S200.

In step S200, the signal processor 30 determines that there is a low possibility that at least one azimuth corresponding to at least one undesired peak is included in the criteria azimuths $\theta_{M+1}, \ldots, \theta_n$ of the tested azimuths $\theta_1, \ldots, \theta_n$.

Thus, in step S205, the signal processor 30 sets a number M' of power estimation targets such that the number M' of power estimation targets is in agreement with the number M of arrivals of echoes estimated in step S130. In step S205, the signal processor 30 also sets a threshold power level $P_{th}$ to a basic level $P_{th0}$ that has been determined in the design phase of the antenna array 19, going to step S220.

In step S210, the signal processor 30 determines that there is a high possibility that at least one azimuth corresponding to at least one undesired peak is included in the criteria azimuths $\theta_{M+1}, \ldots, \theta_n$ of the tested azimuths $\theta_1, \ldots, \theta_n$. Thus, in step S215, the signal processor 30 sets the number M' of power estimation targets such that the number M' of power estimation targets is in agreement with the number n of tested azimuths set in step S140. In step S215, the signal processor 30 also carries out a threshold power-level correction subroutine to thereby set the threshold power level $P_{th}$ to a level different from the basic level $P_{th0}$, going to step S220.

For example, in step S215, the signal processor 30 determines, as the threshold power level $P_{th}$, a level corresponding to an evaluation level in linear independence of the correlations among the steering vectors $\alpha(\theta_1), \ldots, \alpha(\theta_n)$; this evaluation level has been obtained in step S180. The threshold power-level correction subroutine in step S215 will be described in detail hereinafter.

After the completion of step S205 or step S215, the signal processor 30 sequentially selects, from the tested azimuths $\theta_1, \ldots, \theta_n$, the M' azimuths $\theta_1, \ldots, \theta_{M'}$ in a descending order of their corresponding peas from the maximum peak in the MUSIC spectrum in step S220. In step S220, the signal processor S3 sets the selected M' azimuths $\theta_1, \ldots, \theta_{M'}$ as power estimation targets.

Next, in step S230, the signal processor 30 estimates received power levels $P_1, \ldots, P_{M'}$ from the power estimation targets $\theta_1, \ldots, \theta_{M'}$ in accordance with the following steps.

First, the signal processor 30 generates a steering matrix A based on the steering vectors $\alpha(\theta_1), \ldots, \alpha(\theta_{M'})$ corresponding to the power estimation targets $\theta_1, \ldots, \theta_{M'}$ in accordance with the following equation (14):

$$A = [\alpha(\theta_1), \alpha(\theta_2), \ldots, \alpha(\theta_{M'-1}), \alpha(\theta_{M'})] \qquad (8)$$

Based on the steering matrix A, the signal processor 30 calculates a matrix S in accordance with the equation (6) set forth above.

From the m diagonal components in the equation (6), the signal processor 30 derives the received power levels $P_m$ of the power estimation targets $\theta_m$ (m=1, 2, ..., M') in accordance with the following equation (9):

$$[P_1, P_2, \ldots, P_{M'-1}, P_{M'}] = \text{diag}(S) \qquad (9)$$

where diag(f) represents the diagonal components of a given matrix f.

After the completion of calculation of the received power levels $P_1, P_2, \ldots, P_{M'-1}, P_{M'}$ from the power estimation targets $\theta_1, \ldots, \theta_{M'}$, the signal processor 30 proceeds to step S240. In step S240, the signal processor 30 compares each of the received power levels $P_1, P_2, \ldots, P_{M'-1}, P_{M'}$ with the threshold power level $P_{th}$ set in step S205 or S215.

Based on the result of comparisons the signal processor 30 estimates at least one of the power estimation targets $\theta_1, \ldots, \theta_{M'}$, the received power level of which is equal to or greater than the threshold power level $P_{th}$, as the azimuth of at least one real target in step S240.

The signal processor 30 estimates, based on the delay time Tr and the doppler frequency fd contained in each cycle of the beat signal BT for each channel, the distance to the at least one real target and the relative speed between the at least one real target and the motor vehicle.

The signal processor 30 sends, to the cruise control ECU 40, information indicative of the estimated azimuth of the at least one real target in addiction to information indicative of the range of the at least one real target and the relative speed between the at least one real target and the motor vehicle in step S240. Thereafter, the signal processor 30 terminates the target-azimuth estimation routine.

Next, the correlation determination subroutine to be executed by the signal processor 30 will be described hereinafter with reference to FIG. 7.

When starting the correlation determination subroutine called in step S180 of the main routine, the signal processor 30 sequentially selects, from the tested azimuths $\theta_1, \ldots, \theta_n$, the number M of azimuths $\theta_1, \ldots, \theta_M$ in a descending order of their corresponding peaks in the MUSIC spectrum in step S310; this number M of azimuths $\theta_1, \ldots, \theta_M$ is matched with the number M of arrivals of echoes.

In step S310, the signal processor 30 generates a steering matrix A based on steering vectors $\alpha(\theta_1), \ldots, \alpha(\theta_M)$ corresponding to the power estimation targets $\theta_1, \ldots, \theta_M$ in accordance with the following equation (10):

$$A = [\alpha(\theta_1), \alpha(\theta_2), \ldots, \alpha(\theta_{M-1}), \alpha(\theta_M)] \qquad (10)$$

Based on the steering matrix A, the signal processor 30 calculates, in accordance with the following equation (11), a projection matrix $P_{CR}$ orthogonal to a hyperplane orthogonal to a space C spanned by the steering vectors $\alpha(\theta_1), \ldots, \alpha(\theta_M)$ in step S320:

$$P_{CR} = I - A(A^H A)^{-1} A^H \qquad (11)$$

After the calculation of the projection matrix $P_{CR}$ in step S320, the signal processor 30 sets a variable i to the present number a in step S330, and calculates an evaluation level $R_{M+1}$ for the criteria azimuth $\theta_{M+1}$ corresponding to the variable i in accordance with the following equation (12) in step S340:

$$R_{M+i} = 1 - \|P_{CR} \cdot \alpha(\theta_{M+1})\|^2 \qquad (12)$$

The evaluation level $R_{M+i}$ calculated by the equation (12) means a level representing a evaluation of the linear independence between a steering vector $\theta_{M+i}$ and each of the steering vectors $\alpha(\theta_1), \ldots, \alpha(\theta_M)$.

Note that the term $\|z\|$ in the equation (12) represents a norm (L2 norm) of a given vector z.

Figure 7:
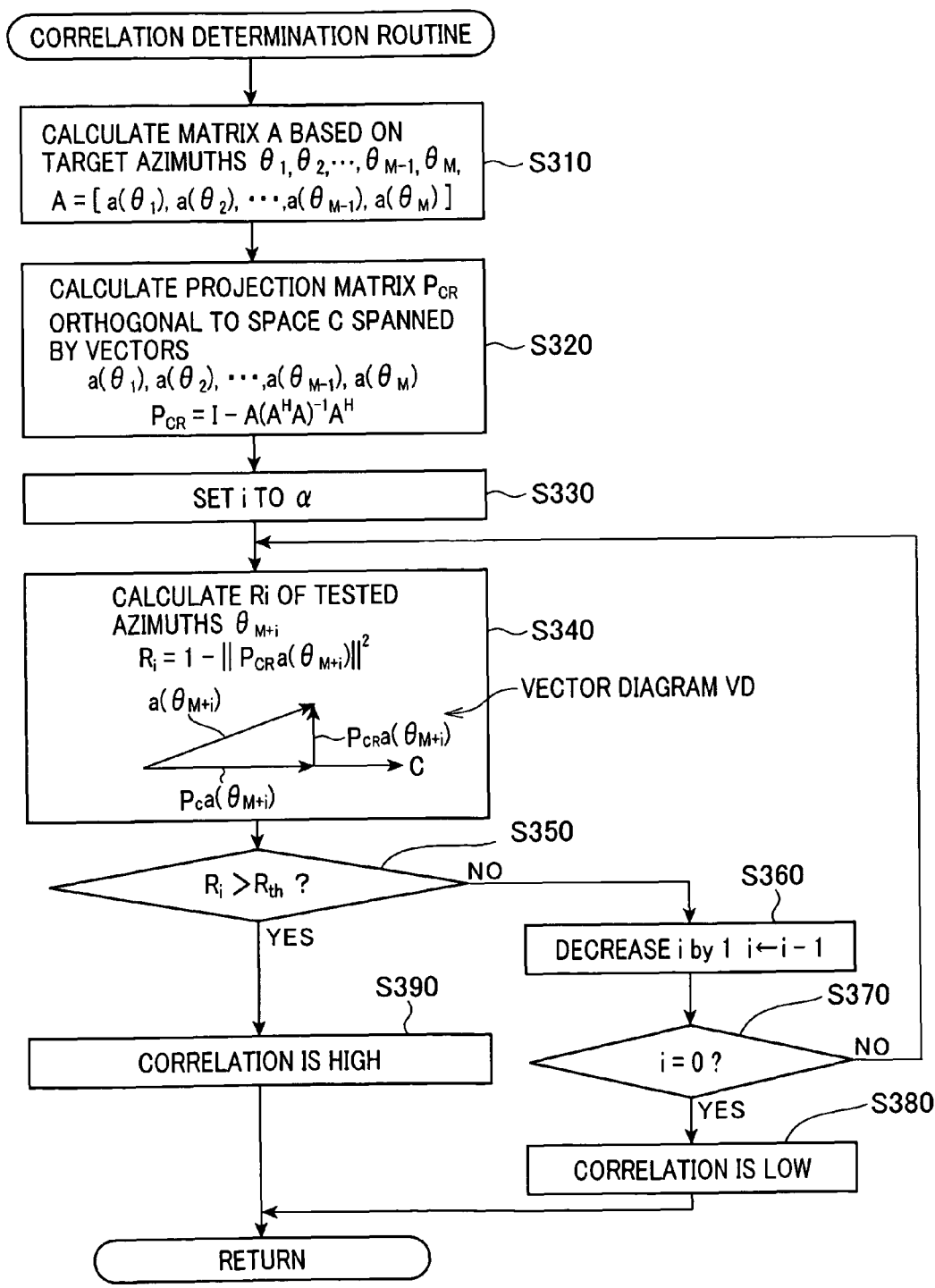
FIG. 7 is a flowchart schematically illustrating a correlation determination subroutine to be called in the target-azimuth estimation routine according to the first embodiment.

When the steering vector $\alpha(\theta_{M+i})$ and the space C are represented as two-dimensional vectors, the relationship between the steering vector $\alpha(\theta_{M+i})$ and the space C are expressed as a vector diagram VD inside step S340 of FIG. 7.

Note that $P_{CR} \cdot \alpha(\theta_{M+i})$ represents a projection vector of the steering vector $\alpha(\theta_{M+i})$ with respect to the space orthogonal to the space C, and the norm $\|P_{CR} \cdot \alpha(\theta_{M+i})\|$ represents the distance between the steering vector $\alpha(\theta_{M+i})$ and the space C. In addition, $P_C \cdot \alpha(\theta_{M+i})$ represents a projection vector of the steering vector $\alpha(\theta_{M+i})$ with respect to the space C. Note that the L2 norm of the steering vector $\alpha(\theta_{M+i})$ is set to 1.

As clearly seen from the relationship, the magnitude of the projection vector $P_{CR} \cdot \alpha(\theta_{M+i})$ is zero when the projection vector $P_{CR} \cdot \alpha(\theta_{M+i})$ is the linear dependence with respect to the steering vectors $\alpha(\theta_1), \ldots, \alpha(\theta_M)$ spanning the space C. In contrast, the magnitude of the projection vector $P_{CR} \cdot \alpha(\theta_{M+i})$ is 1, in other words, the projection vector $P_{CR} \cdot \alpha(\theta_{M+i})$ is orthogonal to the space vector C when the projection vector $P_{CR} \cdot \alpha(\theta_{M+i})$ is orthogonal to the steering vectors $\alpha(\theta_1), \ldots, \alpha(\theta_M)$ spanning the space C.

Thus, the following equation is established:

$$0(\text{linear dependence}) \leq \|PCR \cdot \alpha(\theta_{M+i})\|^2 \leq 1(\text{orthogonal})$$

Because the evaluation level $R_{M+i}$ is defined by the equation (12), the following equation is established:

$$0(\text{orthogonal}) \leq R_{M+i} = 1 - \|PCR \cdot \alpha(\theta_{M-i})\|^2 \leq 1(\text{linear dependence})$$

Thus, the higher the linear independence of the steering vector $\alpha\theta_{M+i}$ with respect to the space C is (the more the steering vector $\alpha(\theta_{M+i})$ approaches the space C), the more the evaluation level $R_{M+i}$ becomes zero. In contrast, the lower the linear independence of the steering vector $\alpha(\theta_{M+i})$ with respect to the space C is (the more the steering vector $\alpha(\theta_{M+i})$ is close to a parallel vector of the space C), the more the evaluation level $R_{M+i}$ becomes 1.

Thus, the evaluation level $R_{M+i}$ defined by the equation (12) allows determination of whether the level of the linear independence between the steering vector $\theta_{M+i}$ and the space C spanned by the steering vectors $\alpha(\theta_1), \ldots, \alpha(\theta_M)$ is high or low.

In addition, in step S340, the signal processor 30 stores, in the memory unit 30a, the calculated evaluation level $R_{M+i}$.

Specifically, after the completion of the calculation of the evaluation level $R_{M+i}$, the signal processor 30 determines whether the calculated evaluation level $R_{M+i}$ is greater than a preset threshold level $R_{th}$ that has been determined in the design phase of the antenna array 19 in step S350.

Upon determining that the calculated evaluation level $R_{M+i}$ is greater than the preset threshold level $R_{th}$ ($R_{M+i} > R_{th}$), the determination in step S350 is affirmative, so the signal processor 30 proceeds to step S390. In step S390, the signal processor 30 determines that the level of the correlations among steering vectors $\alpha(\theta_1), \ldots, \alpha(\theta_n)$ is high, and thereafter, returns to step S190 of the main routine illustrated in FIG. 5.

Otherwise, upon determining that the calculated evaluation level $R_{M+i}$ is equal to or lower than the preset threshold level $R_{th}$ ($R_{M+i} \leq R_{th}$), the determination in step S350 is negative, so the signal processor 30 proceeds to step S360. In step S360, the signal processor 30 decrements the variable i by 1, and thereafter, determines whether the updated variable i is equal to zero in step S370.

Upon determining that the variable i is unequal to zero (NO in step S370), the signal processor 30 returns to step S340. Then, the signal processor 30 carries out the operation in step S340 based on the updated variable i to thereby calculate and store the evaluation level $R_{M+1}$ for the criteria azimuth $\theta_{M+i}$ corresponding to the variable i in accordance with the equation (12). Thereafter, the signal processor 30 determines whether the calculated evaluation level $R_{M+i}$ is greater than the preset threshold level $R_{th}$ in step S350.

Upon determining that the calculated evaluation level $R_{M+i}$ is greater than the preset threshold level $R_{th}$ (YES in step S350), the signal processor 30 determines that the level of the correlations among steering vectors $\alpha(\theta_1), \ldots, \alpha(\theta_n)$ is high (see step S390). Otherwise, upon determining that the calculated evaluation level $R_{M+i}$ is equal to or lower than the preset threshold level $R_{th}$ (NO in step S350), the signal processor 30 determines that the level of the correlations among steering vectors $\alpha(\theta_1), \ldots, \alpha(\theta_n)$ is low (see step S360). Then, the signal processor 30 returns to step S340, and repeatedly carries out the operations in steps S350 and S390 or steps S350 to S370.

During repetitions of the operations in steps S350 to S370, when the updated variable i is equal to zero (YES in step S370), the signal processor 30 determines that the level of the correlations among steering vectors $\alpha(\theta_1), \ldots, \alpha(\theta_n)$ is low, and thereafter, returns to step S190 of the main routine illustrated in FIG. 5.

That is, the correlation determination subroutine is designed to:

determine the level of the correlations among the steering vectors $\alpha(\theta_1), \ldots, \alpha(\theta_n)$ is high when at least one calculated evaluation level $R_{M+i}$ is greater than the preset threshold level $R_{th}$; and determine the level of the correlations among the steering vectors $\alpha(\theta_1), \ldots, \alpha(\theta_n)$ is low when all of the calculated evaluation levels $R_{M+i}$ are equal to or lower than the preset threshold level $R_{th}$.

As described above, the correlation determination subroutine determines the level of the correspondences among the steering vectors $\alpha(\theta_1), \ldots, \alpha(\theta_n)$. On the basis of the determined level, the correlation determination subroutine determines whether the criteria azimuths $\theta_{M+1}, \ldots, \theta_n$ of the tested azimuths $\theta_1, \ldots, \theta_n$, includes at least one azimuth corresponding to at least one undesired peak.

Note that, when being shifted to step S390 while at least one of the evaluation levels $R_{M+i}$ (i=1, ..., $\alpha$) has not been calculated yet, the signal processor 30 calculates the at least one of the evaluation levels $R_{M+i}$ and stores it in the memory unit 30a. This allows all of the evaluation levels $R_{M+1}, \ldots, R_n$ to be stored in the memory unit 30a.

In addition, when being shifted to step S380, all of the evaluation levels $R_{M+1}, \ldots, R_n$ have been calculated thereby and stored in the memory unit 30a.

Next, the threshold power-level correction subroutine to be executed by the signal processor 30 will be described hereinafter with reference to FIGS. 8A to 8C.

FIG. 8B schematically illustrates the configuration of the threshold correction able TA. In the threshold correction table TA, a possible range of the evaluation levels $R_{M+i}$, which is greater than a minimum level $R_{min}$ and equal to or lower than a maximum level $R_{max}$, is divided, in steps of $\Delta$ level, into a number of, such as "Q", sections (Q is an integer equal to or greater than 2). Specifically, the possible range is divided into the first section from the minimum level $R_{min}$ to a level of the sum of the minimum level $R_{min}$ and the $\Delta$ level, the second section from the sum of the minimum level $R_{min}$ and the $\Delta$ level to a level of the sum of the minimum level $R_{min}$ and the $2\Delta$ level, ..., and the Q-th section from the subtraction of the $\Delta$ level from the maximum level $R_{max}$ to the maximum level $R_{max}$. Note that the sum of the minimum level $R_{min}$ and the product of the number Q and the $\Delta$ level is in agreement with the maximum level $R_{max}$.

In the threshold correction table TA, appropriate values TD[1], ..., TD[Q] of the threshold power level $P_{th}$ determined for the first, ..., Q-th sections are stored such that they are associated with the corresponding first to Q-th sections, respectively.

The threshold correction table TA has been generated by a table generator 100 illustrated in FIG. 8C and described hereinafter, and the threshold correction table TA has been written into the at least one nonvolatile memory of the memory unit 3a in the manufacturing phase of the radar 1.

When starting the threshold power-level correction subroutine called in step S215 of the main routine, the signal processor 30 reads out, from the threshold correction table TA, a number $\alpha$ of appropriate values of the appropriate values TD[1], ..., TD[Q] of the threshold power level $P_{th}$ corresponding to the evaluation levels $R_{M+1}, \ldots, R_n$ corresponding to the criteria azimuths $\theta_{M+1}, \ldots, \theta_n$ of the tested azimuths $\theta_1, \ldots, \theta_n$ in step S410.

Next, in step S420, the signal processor 30 determines the threshold power level $P_{th}$ to be used in step S240 based on the $\alpha$ appropriate values corresponding to the $R_{M+1}, \ldots, R_n$ in step S420.

Specifically, in step S240, the signal processor 30 determines, as the threshold power level $P_{th}$, a maximum one of the $\alpha$ appropriate values corresponding to the $R_{M+1}, \ldots, R_n$. Thereafter the signal processor 30 returns to step S220 of the main routine. Therefore, in step S240 of the main routine when the affirmative determination is made in step S190, the signal processor 30 executes the operation in step S240 using the threshold power level $P_{th}$ determined in step S215.

Figure 9A:
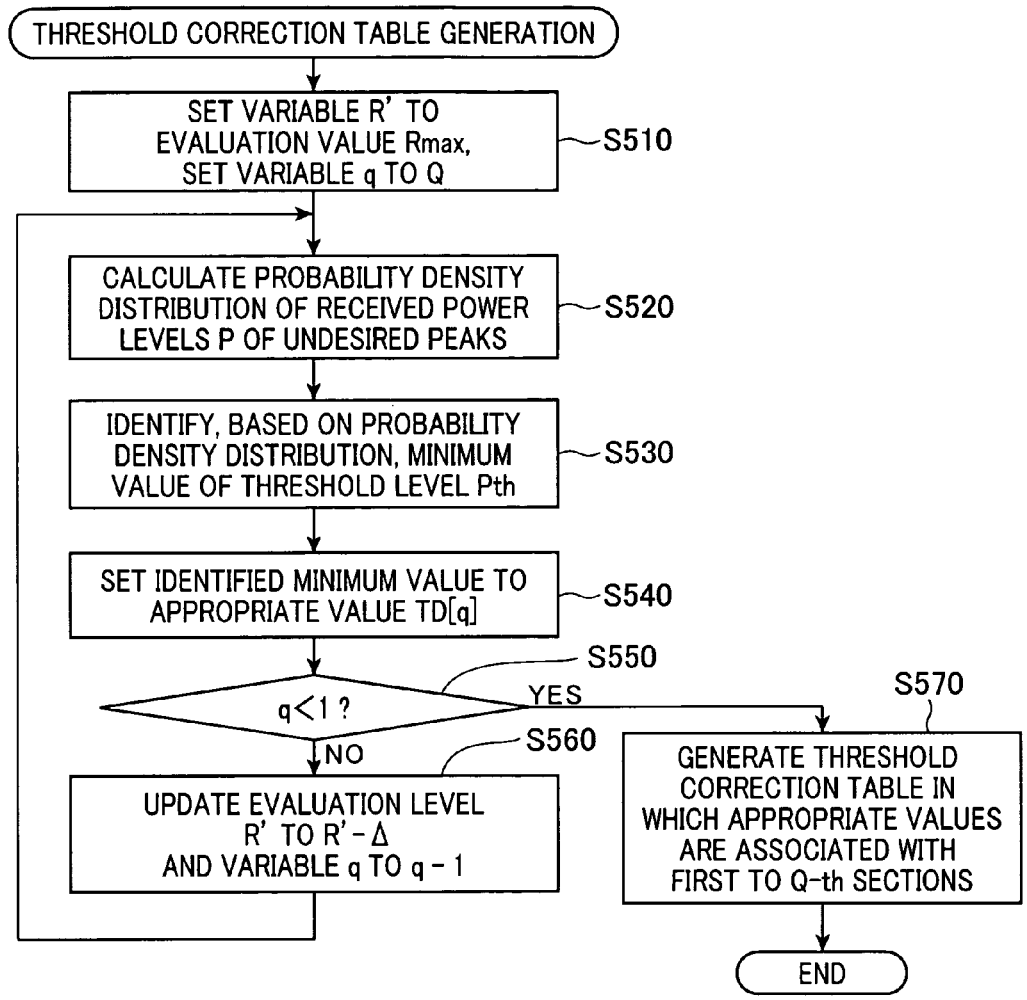
FIG. 9A is a flowchart schematically illustrating a threshold correction table generating routine to be executed by the table generator illustrated in FIG. 8C.

Next, a threshold correction table generating routine to be executed by the table generator 100 will be described hereinafter with reference to FIG. 9A. The table generator 100 is made up of, for example, a microcomputer with a display device and a memory it 100a consisting of a hard disk drive and volatile and nonvolatile memories in which a program corresponding to the threshold correction table generating routine is stored in advance.

The program stored in the memory unit 100a causes the table generator 100 to carry out the threshold correction table generating routine.

When starting the threshold correction table generating routine, the table generator 100 sets, to the maximum level $R_{max}$, a variable R' of the evaluation levels $R_{M+i}$ corresponding to a target of an appropriate value to be calculated in step S510. In step S510, the table generator 100 also sets, to Q, a variable q indicative of an ordinal number of the sections to be calculated. Specifically, in step S510, the Q-th section is set.

Next, the table generator 100 carries out computer simulations to thereby compute a probability density distribution of received power levels P of undesired peaks caused in an environment in which the variable R' of the evaluation levels $R_{M+i}$ can be obtained in step S520.

Specifically, in step S520, the table generator 100 obtains, as the probability density distribution, a distribution of the received power level P in accordance with the following equation (13) using parameter vectors X and N(i) as random values:

$$P = \frac{X^H \left(\frac{1}{L}\sum_{i=1}^{L} N(i)N^H(i)\right) X}{(\|X\|^2)^2} \quad (13)$$

where each of the vectors X and N(i) is a K-dimensional complex vector, and the vector X is randomly given within the range that meets the following equation (14):

$$\|X\|^2 = 1 - R' \quad (14)$$

Specifically, the vector X is generated in accordance with the following equations (15) and (16) using K-dimensional real vectors $r_x$ and $r_y$:

$$X = \frac{\sqrt{1-R'}}{\|w\|} w \quad (15)$$

$$w = r_x + jr_y \quad (16)$$

where j represents imaginary unit, and each element of each of the K-dimensional real vectors $r_x$ and $r_y$ is defined as a random number that follows a uniform distribution U(−1,1); this definition can be given by the following mathematical expression: "$r_x, r_y \sim U(-1,1)$".

Similarly, the vector N(i) is generated in accordance with the following equation (17) using K-dimensional real vectors $r_{x1}$ and $r_{y1}$:

$$N(i) = \frac{r_{x1} + jr_{y1}}{\sqrt{2}} \quad (17)$$

where each of the K-dimensional real vectors $r_{x1}$ and $r_{y1}$ is defined as a random number that follows a normal distribution $N(0,\sigma^2 I)$ with a covariance matrix of $\sigma^2 I$ and an averaged value of zero. As described above, the reference character $\sigma^2$ represents the thermal noise power.

After computing the probability density distribution, the table generator 100 identifies, based on the probability density distribution, a minimum value of the threshold level $P_{th}$ at which the probability of the received power P being equal to or greater than the minimum value of the threshold level $P_{th}$ is less than a preset value in step S530.

Figure 9B:
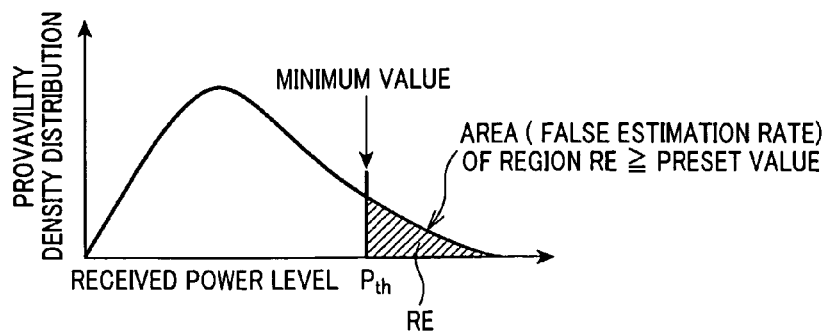
FIG. 9B is a graph schematically illustrating an example of a probability density distribution computed in step S520 of FIG. 9A according to the first embodiment.

FIG. 9B is a graph illustrating an example of the probability density distribution computed in step S520, and demonstrates how to determine the appropriate values TD.

Specifically in step S530, a minimum value of the threshold level $P_{th}$ is identified; this minimum value of the threshold level $P_{th}$ allows the area of the diagonally hatched region RE (see FIG. 9B) of the probability density distribution equal to or greater than the minimum value of the threshold level $P_{th}$ to be less than the preset value. The probability of the received power P being equal to or greater than the minimum value of the threshold level $P_{th}$ corresponds to a probability (false estimation rate, false detection rate) that azimuths corresponding to undesired peaks are erroneously estimated as azimuths for real targets.

After completion of the operation in step S530, the table generator 100 sets the identified minimum value of the threshold level $P_{th}$ to the appropriate value TD[q] of the threshold power level $P_{th}$ determined for the q-th section in step S540. In other words, the table generator 100 sets, to the appropriate value TD[q] of the threshold power level $P_{th}$, the identified minimum value of the threshold level Pa that should be set when the evaluation levels $R_{M+i}$ is within the range represented by the following equation: "$R'-\Delta < R_{M+i} < R'$" in step S540.

In step S540, the table generator 100 stores, in the memory unit 100a, the appropriate value TD[q] of the threshold power level $P_{th}$. Because the currently set value of the variable q is Q, the appropriate value TD[Q] of the threshold power level $P_{th}$ is stored in the memory unit 100a.

Next, the table generator 100 determines whether the currently set value of the variable q is less than 1 in step S550. Upon determining that the currently set value of the variable q is equal to or greater than 1 (NO in step S550), the table generator 100 proceeds to step S560. In step S560, the table generator 100 decrements the currently set value of the variable R' by the Δ level, and decrements the currently set value of the variable q by 1. Thereafter, the table generator 100 returns to step S520 and repeatedly carries out the operations in steps S510 to S560 based on the updated value of the variable R' and the updated value of the variable q.

As a result of the repetitions of the operations in steps S510 to S560, when it is determined that the currently set value of the variable q is lower than 1 (YES in step S550), the table generator 100 proceeds to step S570.

At the moment, in the memory unit 100a, the appropriate values TD[1], . . . , TD[Q] of the threshold power level $P_{th}$ are stored.

In step S570, the table generator 100 generates records in which the appropriate values TD[1], . . . , TD[Q] of the threshold power level $P_{th}$ are associated with the corresponding first, . . . , Q-th sections, respectively. Based on the records, the table generator 100 generates the threshold correction table TA illustrated in FIG. 8B, and stores it in the memory unit 100a. In step S570, the table generator 100 can visibly display the threshold correction table TA on the display device.

The threshold correction table TA generated in step S570 can be transferred from the table generator 100 to the signal processor 30 via a removable nonvolatile memory or radio/cable communications so as to be installed in the signal processor 30.

As described above, the radar 1 according to the first embodiment is configured to set the (M+α) number of tested azimuths greater than the number M of arrivals of echoes so as to prevent the accuracy of estimating azimuths of real targets from being deteriorated due to undesired peaks appearing in the MUSIC spectrum.

In addition, the radar 1 is configured to determine whether the level of the correlations among steering vectors $\alpha(\theta_1), \ldots, \alpha(\theta_{M+\alpha})$ corresponding to the tested azimuths $\theta_1, \ldots, \theta_{M+\alpha}$ is high or low to thereby determine whether azimuths of undesired peaks are included in the criteria azimuths $\theta_{M+1}, \ldots, \theta_{M+\alpha}$ of the tested azimuths $\theta_1, \ldots, \theta_{M+\alpha}$.

When it is determined that there is a high possibility that at least one azimuth corresponding to at least one undesired peak is included in the criteria azimuths $\theta_{M+1}, \ldots, \theta_{M+\alpha}$ of the tested azimuths $\theta_1, \ldots, \theta_{M+\alpha}$, the radar 1 sets the number of power estimation targets to the sum (M+α) of the preset number α and the number M of arrivals of echoes estimated in step S130. This prevents at least one azimuth corresponding to at least one desired peak from being out of the power estimation targets.

In addition, when it is determined that there is a high possibility that at least one azimuth corresponding to at least one undesired peak is included in the criteria azimuths $\theta_{M+1}, \ldots, \theta_{M+\alpha}$ of the tested azimuths $\theta_1, \ldots, \theta_{M+\alpha}$, the radar 1 sets the number of power estimation targets to the sum (M+α) of the preset number α and the number M of arrivals of echoes estimated in step S130. This prevents at least one azimuth corresponding to at least one desired peak from being out of the power estimation targets, thus more increasing the accuracy of estimating azimuths of real targets.

When it is determined that there is a high possibility that at least one azimuth corresponding to at least one undesired peak is included in the criteria azimuths $\theta_{M+1}, \ldots, \theta_{M+\alpha}$ of the tested azimuths $\theta_1, \ldots, \theta_{M+\alpha}$, the radar 1 adjusts the threshold level $P_{th}$ to thereby eliminate azimuths corresponding to undesired peaks as much as possible. This prevents azimuths corresponding to undesired peaks from being erroneously identified as azimuths of real targets.

The radar 1 therefore more improves the accuracy of estimating azimuths of real targets as compared with that achieved by conventional radars using the number M of power estimation azimuths.

Moreover, when it is determined that there is a high possibility that at least one azimuth corresponding to at least one undesired peak is not included in the criteria azimuths $\theta_{M+1}, \ldots, \theta_{M+\alpha}$ of the tested azimuths $\theta_1, \ldots, \theta_{M+\alpha}$, the radar 1 sets the number of power estimation targets to the number M of arrivals of echoes estimated in step S130. This prevents the deterioration of the accuracy of estimating azimuths of real targets; this deterioration of the accuracy is caused by setting the number of power estimation targets to a value greater than the number M arrivals of echoes although no undesired peaks appear in the MUSIC spectrum.

Thus, the radar 1 according to the first embodiment estimates azimuths of real targets with high accuracy even if no undesired peaks appear in the MUSIC spectrum, thus providing the radars 1 with wide FOV and high accuracy of estimating azimuths of real targets.

Second Embodiment

A radar according to the second embodiment of the present invention will be described hereinafter with reference to FIGS. 10A, 10B, and 11.

The structure of the radar according to the second embodiment is substantially identical to that of the radar 1 according to the first embodiment except for the following different points. So, like parts between the radars according to the first and second embodiments, to which like reference characters are assigned, are omitted or simplified in description.

The radar 1 according to the first embodiment is designed to eliminate azimuths corresponding to undesired peaks that appear in the MUSIC spectrum based on the threshold correction table TA in which the appropriate values TD[1], ..., TD[Q] of the threshold power level $P_{th}$ corresponding to the evaluation levels $R_{M+i}$ are stored.

Note that there are constant patterns in principle between azimuths in which undesired peaks appear and azimuths in which peaks except for the undesired peaks appear. Thus, the radar according to the second embodiment is configured such that a threshold correction table TA1 stores therein an appropriate value TD of the threshold power level $P_{th}$ for each of combinations (groups) of azimuths; these combinations are settable as tested azimuths.

Figures 10A, 10B:
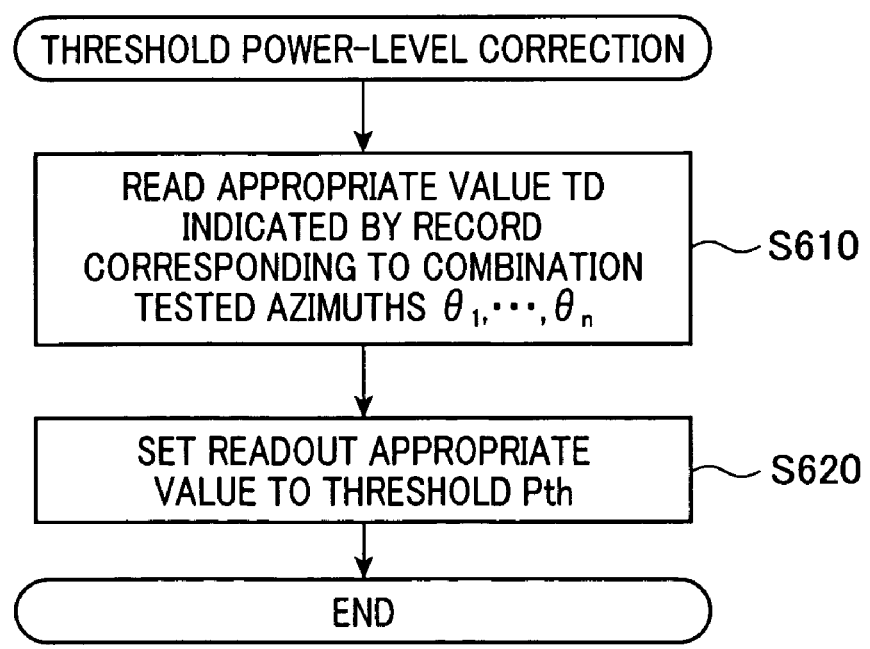
FIG. 10A is a view schematically illustrating an example of the configuration of a threshold correction table installed in the signal processor according to a second embodiment of the present invention.
FIG. 10B is a flowchart schematically illustrating a threshold power-level correction subroutine to be called in the target-azimuth estimation routine according to the second embodiment.

Specifically, the configuration of the threshold correction table TA1 according to the second embodiment is illustrated in FIG. 10A.

The threshold correction table TA1 consists of Q records in which previously determined Q different combinations Θ[1] ... Θ[Q] of azimuths are registered, respectively. Appropriate values TD[1], ..., TD[Q] of the threshold power level $P_{th}$ determined for the first, ..., Q-th combinations Θ[1] ... Θ[Q] of azimuths are stored in the Q records of the threshold correction table TA1 to be associated with the Q combinations Θ[1] ... Θ[Q] of azimuths, respectively.

The threshold correction table TA1 has been generated by a table generator 100A illustrated in FIG. 11 and described hereinafter, and the threshold correction table TA1 has been written into the at least one nonvolatile memory of the memory unit 3a in the manufacturing phase of the radar according to the second embodiment.

When starting a threshold power-level correction subroutine called in step S215 of the main routine, the signal processor 30 retrieves, from the threshold correction table TA1, a record that meets a combination Θ of the tested azimuths $\theta_1, \ldots, \theta_n$, and reads out an appropriate value TD stored in the retrieved record in step S610 of FIG. 10B.

Next, in step S620, the signal processor 30 sets the retrieved appropriate value TD to the threshold power level $P_{th}$ to be used in step S240, and thereafter, returns to step S220 of the main routine. Therefore, in step S240 of the main routine when the affirmative determination is made in step S190, the signal processor 30 executes the operation in step S240 using the threshold power level $P_{th}$ set in step S215 (steps S610 and S620).

A threshold correction table generating routine to be executed by the table generator 100A will be described hereinafter with reference to FIG. 11.

Initial data of the threshold correction table TA1 for example provided from a user is stored beforehand in the memory unit 100a. A program stored in the memory unit 100a causes the table generator 100A to carry out the threshold correction table generating routine.

When starting the threshold correction table generating routine, the table generator 100A reads out the initial data from the threshold correction table TA1 in step S710.

Note that the initial data of the threshold correction table TA1 represents an uncompleted table consisting of the first to Q-th records in which no appropriate values TD[1], ..., TD[Q] of the threshold power level $P_{th}$ are stored.

Each record of the initial data of the threshold correction table TA1 includes information indicative of a combination Θ of azimuths $\{\theta_1, \ldots, \theta_n\}$. The combination of azimuths $\{\theta_1, \ldots, \theta_n\}$ consists of a first sub combination $\Theta_p$ of (n−α) azimuths $\{\theta_1, \ldots, \theta_{n-\alpha}\}$ and a second sub combination $\Theta_s$ of α azimuths $\{\theta_{n-(\alpha-1)}, \ldots, \theta_n\}$. The second sub combination $\Theta_s$ represents a combination of azimuths in which undesired peaks appear when the first sub combination $\Theta_p$ is selected.

Next in step S720, the table generator 100A selects, as a target record, the first record of the initial data of the threshold correction table TA1 in step S720. In step S730, the signal processor 30 generates a matrix B corresponding to the combination Θ of azimuths $\{\theta_1, \ldots, \theta_n\}$ indicated by the target record; this matrix B is represented by the following equation (18):

$$B = [\alpha(\theta_1), \ldots, \alpha(\theta_n)] \quad (18)$$

After the generation of the matrix B, the table generator 100A carries out computer simulations to thereby compute a probability density distribution of received power levels $P_{n-(\alpha-1)}, \ldots, P_n$ of undesired peaks caused in an environment in which the combination Θ of azimuths $\{\theta_1, \ldots, \theta_n\}$ indicated by the target record are selected in step S740.

An example of various methods of achieving the probability density distribution of received power levels $P_{n-(\alpha-1)}, \ldots, P_n$ by computer simulations, which is used in step S740, will be described hereinafter.

When arrival echoes from azimuths $\theta_1, \ldots, \theta_{n-\alpha}$ are received by the K antennas of the antenna array 19, a received vector X(i) at time i is defined by the following equation (19):

$$X(i) = \sum_{m=1}^{n-\alpha} s_m a(\theta_m) + N(i) \quad (19)$$

The received vector X(i) is created by computer simulations when $s_m$ is considered as a fixed value and the vector N(i) is a K-dimensional complex vector (random number) corresponding to white Gaussian noise. From the equation (19), an autocorrelation matrix Rxx with K rows and K columns represented as the equation (2) is derived.

Using the autocorrelation matrix Rxx allows a matrix D to be calculated in accordance with the following equation (20):

$$D = B(B^H B)^{-1} B^H (Rxx - \Sigma) B (B^H H)^{-1} \quad (20)$$

where $\Sigma$ is an average value E of the $N(i) \cdot N^H(i)$; this average value E is represented by "$E = [N(i) \cdot N^H(i)]$".

m diagonal components of the mat D correspond to received power levels $P_m$ of azimuths $\theta_m$ (m=1, 2, ..., M+$\alpha$) (see the following equation (21)):

$$[P_1, \ldots, P_{n-\alpha}, P_{n-(\alpha-1)}, \ldots, Pn] = \text{diag}(D) \quad (21)$$

Thus, the received power levels $P_{n-(\alpha-1)}, \ldots, P_n$ generated by the computer simulations allow the probability density distribution of the received power levels $P_{n-(\alpha-1)}, \ldots, P_n$ corresponding to respective undesired peaks to be generated.

After completion of the generation of the probability density distribution, the table generator 100A proceeds to step S730.

In step S750, the table generator 100A selects, from the probability density distribution of the received power levels $P_{n-(\alpha-1)}, \ldots, P_n$ corresponding to azimuths $\theta_{n-(\alpha-1)}, \ldots, \theta_n$, minimum values $P^*_{n-(\alpha-1)}, \ldots, P^*_n$ of the threshold level $P_{th}$ at each of which the probability of the received power being equal to or greater than the corresponding minimum value of the threshold level $P_{th}$ is less than a preset value. The operation in step S750 is in the same manner as that in step S530.

Next, the table generator 100A selects the highest one of the identified minimum values $P^*_{n-(\alpha-1)}, \ldots, P^*_n$ of the threshold level $P_{th}$ as an appropriate value of the threshold level $P_{th}$ corresponding to the combination $\Theta$ of azimuths $\{\theta_1, \ldots, \theta_n\}$ stored in the target record in step S760.

After completion of the operation in step S760, the table generator 100A edits the initial data of the threshold correction table TA1 read out in step S710 to thereby write the selected appropriate value into a corresponding field of the target record in step S770. This completes the target record.

Next, the table generator 100A determines whether all of the records of the initial data of the threshold correction table TA1 have been subjected to the operations in steps S730 to S770 in step S780.

Upon determining that at least one record of the initial data has not been subjected to the operations in steps S730 to S770 yet (NO in step S780), the table generator 100A sets the next record from the currently set target record as the target record in step S785.

Thereafter, the table generator 100A returns to step S730 and repeatedly carries out the operations in steps S730 to S785 based on the target record.

As a result of the repetitions of the operations in steps S730 to S785, when it is determined that all records of the initial data have been subjected to the operations in steps S730 to S770 (YES in step S780), the table generator 100A determines that the threshold correction table TA1 is completed, proceeding to step S790. In step S790, the table generator 100A stores the completed threshold correction table TP1 in the memory unit 100a, eating the threshold power-level correction subroutine.

The threshold correction table TA1 generated in step S790 can be transferred from the table generator 100A to the signal processor 30 via a removable nonvolatile memory or radio/cable communications so as to be installed in the signal processor 30.

As described above, the radar according to the second embodiment achieves the same advantages as the radar 1 according to the first embodiment.

Third Embodiment

A radar according to the third embodiment of the present invention will be described hereinafter with reference to FIGS. 12A, 12B, and 13.

The structure of the radar according to the third embodiment is substantially identical to that of the radar according to the first or second embodiment except for the following different points. So, like parts between the radars according to the first or second embodiment and the third embodiment, to which like reference characters are assigned, are omitted or simplified in description.

The radar according to the third embodiment includes an evaluation-level table ETA stored in the memory unit 30a of the signal processor 30. The evaluation-level table ETA is illustrated in FIG. 1 by phantom line (chain double dashed line) so that the evaluation-level table ETA can be omitted in the radar 1 according to the first embodiment.

The signal processor 30 according to the third embodiment is programmed to carry out a correlation determination subroutine based on the evaluation-level table ETA when the correlation determination subroutine is called in step S180 of the main routine.

Figures 12A, 12B:
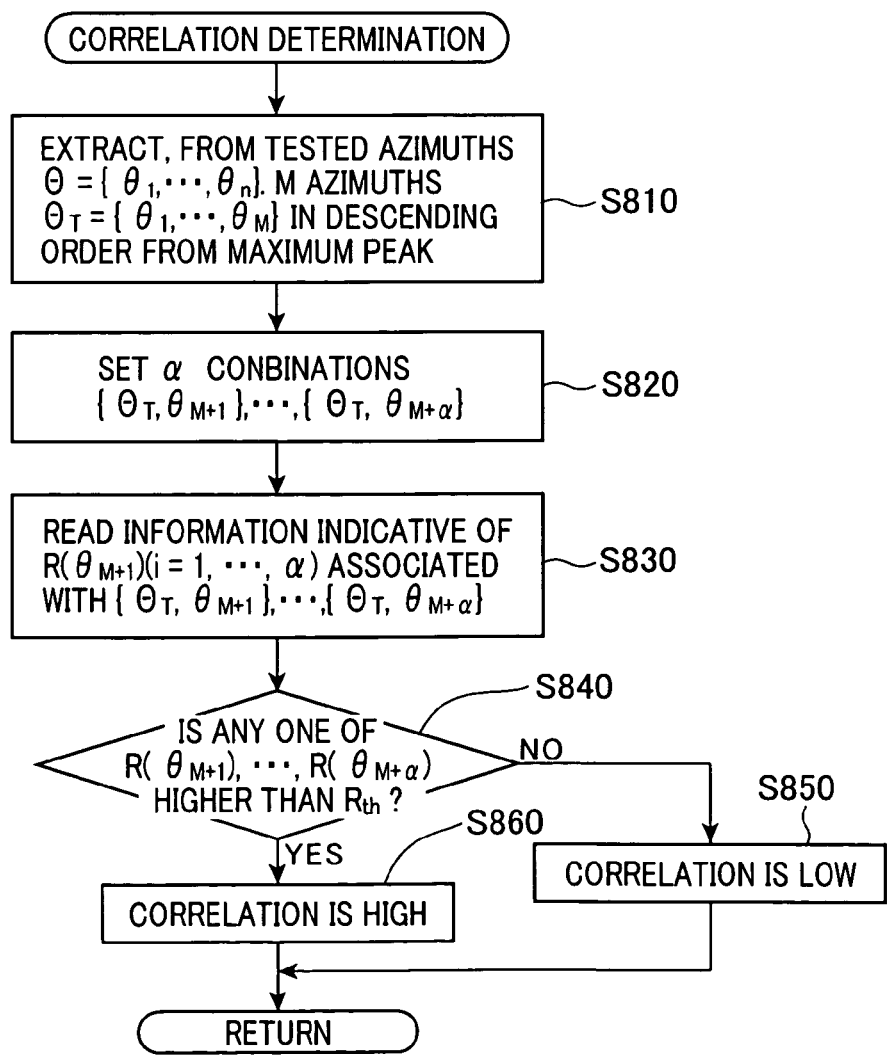
FIG. 12A is a view schematically illustrating an example of the configuration of an evaluation-level table installed in the signal processor according to a third embodiment of the present invention.
FIG. 12B is a flowchart schematically illustrating a correlation determination subroutine to be called in the target-azimuth estimation routine according to the third embodiment.

The configuration of the evaluation-level table ETA according to the third embodiment is illustrated in FIG. 12A.

The evaluation-level table ETA consists of Q records in which previously determined Q different combinations $\Theta[1] \ldots \Theta[Q]$ of azimuths are registered, respectively. The Q combinations $\Theta$ of azimuths stored in a record consist of a combination $\Theta$ of azimuths $\{\theta_1, \ldots, \theta_n\}$ settable as tested azimuths.

The combination $\Theta$ of the azimuths $\{\theta_1, \ldots, \theta_n\}$ is divided into a first sub combination $\Theta_T$ of M azimuths $\{\theta_1, \ldots, \theta_M\}$ and a second sub combination $\Theta_{SP}$ of azimuths $\theta_{SP}$.

The M azimuths $\{\theta_1, \ldots, \theta_M\}$ of the first sub combination $\Theta_T$ can be estimated as azimuths of M arrival echoes; corresponding peaks of the M azimuths $\theta_1, \ldots, \theta_M$ are aligned in a descending order from the maximum peak in the MUSIC spectrum. The azimuths $\theta_{SP}$ of the second sub combination $\Theta_{SP}$ are potentially set as some of the tested azimuths.

Thus, each of the Q different combinations $\Theta[1] \ldots \Theta[Q]$ of azimuths will be referred to as "a combination $\Theta_D$ of $\{\Theta_T, \Theta_{SP}\}$ of azimuths.

For each of the combinations $\Theta_D$ of $\{\Theta_T, \Theta_{SP}\}$ of azimuths, evaluation levels $R(\theta_{SP})$ are stored in a corresponding one record of the Q records. The evaluation levels $R(\theta_{SP})$ stored in one record represents the level of the linear independence between a steering vector $\alpha(\theta_{SP})$ of each azimuth $\theta_{SP}$ and steering vectors $\alpha(\theta_1), \ldots, \alpha(\theta_M)$ of the azimuths $\{\theta_1, \ldots, \theta_M\}$ of the corresponding first sub combination $\Theta_T$.

when starting the correlation determination subroutine, the signal processor 30 extracts, from the tested azimuths $\theta_1, \ldots, \theta_n$, the number M of azimuths $\theta_1, \ldots, \theta_M$ in a descending order of their corresponding peas from the maximum peak in the MUSIC spectrum in step S810. Thus, in step S810, the signal processor 30 identifies the combination $\Theta_T$ of the azimuths $\theta_1, \ldots, \theta_M$ of arrivals of echoes.

Next, the signal processor 30 combines each of the remaining azimuths $\theta_{M+1}, \ldots, \theta_{M+\alpha}$, with the combination $\Theta_T$ of the azimuths $\theta_1, \ldots, \theta_M$ to thereby set the number of $\alpha$ of combinations $\{\Theta_T, \theta_{M+1}\}, \ldots, \{\Theta_T, \theta_{M+\alpha}\}$ as a searched combination in step S820.

Thereafter, the signal processor 30 references the evaluation-level table ETA, and reads out, from the evaluation-level table ETA, the evaluation levels $R(\theta_{m+i})$ (i=1, \ldots, $\alpha$) that are associated with the respective combinations $\{\Theta_T, \theta_{M+1}\}, \ldots, \{\Theta_T, \theta_{M+\alpha}\}$ in step S830.

In step S840, the signal processor 30 determines whether at least one of the calculated evaluation levels $R(\theta_{m+i})$ is greater than the preset threshold level $R_{th}$ that has been determined in the design phase of the antenna array 19.

Upon determining that all of the calculated evaluation levels $R(\theta_{m+1})$ are equal to or lower than the preset threshold level $R_{th}$ (NO in step S840), the signal processor 30 determines that the correlations among steering vectors $\alpha(\theta_1), \ldots, \alpha(\theta_n)$ is low in step S850.

Otherwise, upon determining that least one of the calculated evaluation levels $R(\theta_{m+1})$ is greater than the preset threshold level $R_{th}$ (YES in step S840), the signal processor 30 determines that the correlations among steering vectors $\alpha(\theta_1), \ldots, \alpha(\theta_n)$ is high in step S860. Thereafter, the signal processor 30 returns to step S190 of the main routine.

A threshold correction table generating routine to be executed by a table generator 100B according to the third embodiment is stored in the memory unit 100a of the table generator 100B. A program stored in the memory unit 100a of the table generator 100B causes the table generator 100B to carry out the threshold correction table generating routine.

When starting the threshold correction table generating routine, the table generator 100B generates an empty table (file) for the evaluation-level table ETA in step S910. Then, the table generator 100B selects, from the combinations $\Theta$ of azimuths $\{\theta_1, \ldots, \theta_n\}$ settable as the tested azimuths, one first sub combination $\Theta_T$ as a target combination $\Theta_T$ T in step S910; is one first sub combination $\Theta_T$ consists of the M azimuths $\theta_1, \ldots, \theta_M$ aligned in a descending order from the maximum peak in the MUSIC spectrum.

Next, the table generator 100B generates a steering matrix A based on steering vectors $\alpha(\theta_1), \ldots, \alpha(\theta_M)$ corresponding to the M azimuths $\theta_1, \ldots, \theta_M$ of the target combination $\Theta_T$ in accordance with the equation (10) set forth above in step S920.

Based on the steering matrix A, the table generator 100B calculates, in accordance with the equation (11) set forth above, a projection matrix $P_{CR}$ orthogonal to a hyperplane orthogonal to a space C spanned by the steering vectors $\alpha(\theta_1), \ldots, \alpha(\theta_M)$ in step S930.

After the calculation of the projection matrix $P_{CR}$ in step S930, the table generator 100B calculates evaluation levels $R_{SP}$ for the steering vectors $\alpha(\theta_{SP})$ corresponding to the target combination $\Theta_T$ in accordance with the following equation (22) in step S940:

$$R(\theta_{SP}) = 1 - \|P_{CR} \cdot \alpha(\theta_{SP})\|^2 \quad (22)$$

Next, the table generator 100B records, in the empty table, a record consisting of: the combination $\Theta_D$ of $\{\Theta_T, \Theta_{SP}\}$ of azimuths corresponding to the target combination $\Theta_T$, and each of the evaluation levels $R(\theta_{SP})$ in step S950.

Next, the table generator 100B determines whether all of the first sub combinations $\Theta_T$ of the combinations $\theta$ of azimuths $\{\theta_1, \ldots, \theta_n\}$ have been subjected to the operations in steps S920 to S950 in step S960.

Upon determining that at least one first sub combination $\Theta_T$ of the combinations $\Theta$ of azimuths $\{\theta_1, \ldots, \theta_n\}$ has not been subjected to the operations in steps S920 to S950 yet (NO in step S960), the table generator 100B proceeds to step S970. In step S970, the table generator 100B selects, from the remaining first sub combinations $\Theta_T$ of the combinations $\Theta$ of azimuths $\{\theta_1, \ldots, \theta_n\}$ settable as the tested azimuths, an alternative one first sub combination $\Theta_T$ as the target combination $\Theta_T$ in step S970.

Thereafter, the table generator 100B returns to step S920 and repeatedly carries out the operations in steps S920 to S970 based on the target combination $\Theta_T$.

As a result of the repetitions of the operations in steps S920 to S970, when it is determined that all of the first sub combinations $\Theta_T$ of the combinations $\Theta$ of azimuths $\{\theta_1, \ldots, \theta_n\}$ have been subjected to the operations in steps S920 to S950 (YES in step S960), the table generator 100B determines that the evaluation-level table ETA is completed, proceeding to step S980.

In step S980, the table generator 100B stores the evaluation-level table ETA in the memory unit 100a, exiting the threshold correction table generating routine.

The evaluation-level table ETA generated in step S980 can be transferred from the table generator 100B to the signal processor 30 via a removable nonvolatile memory or radio/cable communications so as to be installed in the signal processor 30.

As described above, the radar according to the third embodiment is configured to identify the valuation levels $R(\theta_{m+i})$ (i=1, \ldots, $\alpha$) by reading out them from the evaluation-level table ETA. This reduces a load required for the signal processor 30 to carry out the correlation determination subroutine. Thus, in addition to the advantages achieved by the radar according to the first or second embodiment, it is possible to design the radar according to the third embodiment using a microcomputer with a normal processing capability; this microcomputer serves as the signal processor 30.

The evaluation-level table ETA can consist of records in which evaluation levels $R(\theta_{SP})$ higher than the threshold value $R_{th}$ and some of the combinations $\Theta_D$ of $\{\Theta_T, \Theta_{SP}\}$ of azimuths corresponding to the evaluation levels $R(\theta_{SP})$ are stored in a correlation manner. In this modification, in step S820, when no records corresponding to some of the $\alpha$ combinations $\{\Theta_T, \theta_{M+1}\}, \ldots, \{\Theta_T, \theta_{M+\alpha}\}$ are registered in the evaluation-level table ETA, the signal processor 30 can determine that the evaluation levels $R(\theta_{m+i})$ corresponding to the unregistered records are equal to or lower than the preset threshold level $R_{th}$ in step S840.

The evaluation-level table ETA can consist of records in which evaluation levels $R(\theta_{SP})$ equal to or lower than the threshold value $R_{th}$ and some of the combinations $\Theta_D$ of $\{\Theta_T, \Theta_{SP}\}$ of azimuths corresponding to the evaluation levels $R(\theta_{SP})$ are stored in a correlation manner. In this modification, in step S820, when no records corresponding to some of the $\alpha$ combinations $\{\Theta_T, \theta_{M+1}\}, \ldots, \{\Theta_T, \theta_{M+\alpha}\}$ are registered in the evaluation-level table ETA, the signal processor 30 can determine that the evaluation levels $R(\theta_{m+i})$ corresponding to the unregistered records are greater than the preset threshold level $R_{th}$ in step S840.

Fourth Embodiment

A radar according to the fourth embodiment of the present invention will be described hereinafter with reference to FIG. 14.

The structure of the radar according to the fourth embodiment is substantially identical to that of the radar according to the first or second embodiment except for the following different points. So, like parts between the radars according to the first or second embodiment and the fourth embodiment, to which like reference characters are assigned, are omitted or simplified in description.

Figure 14:
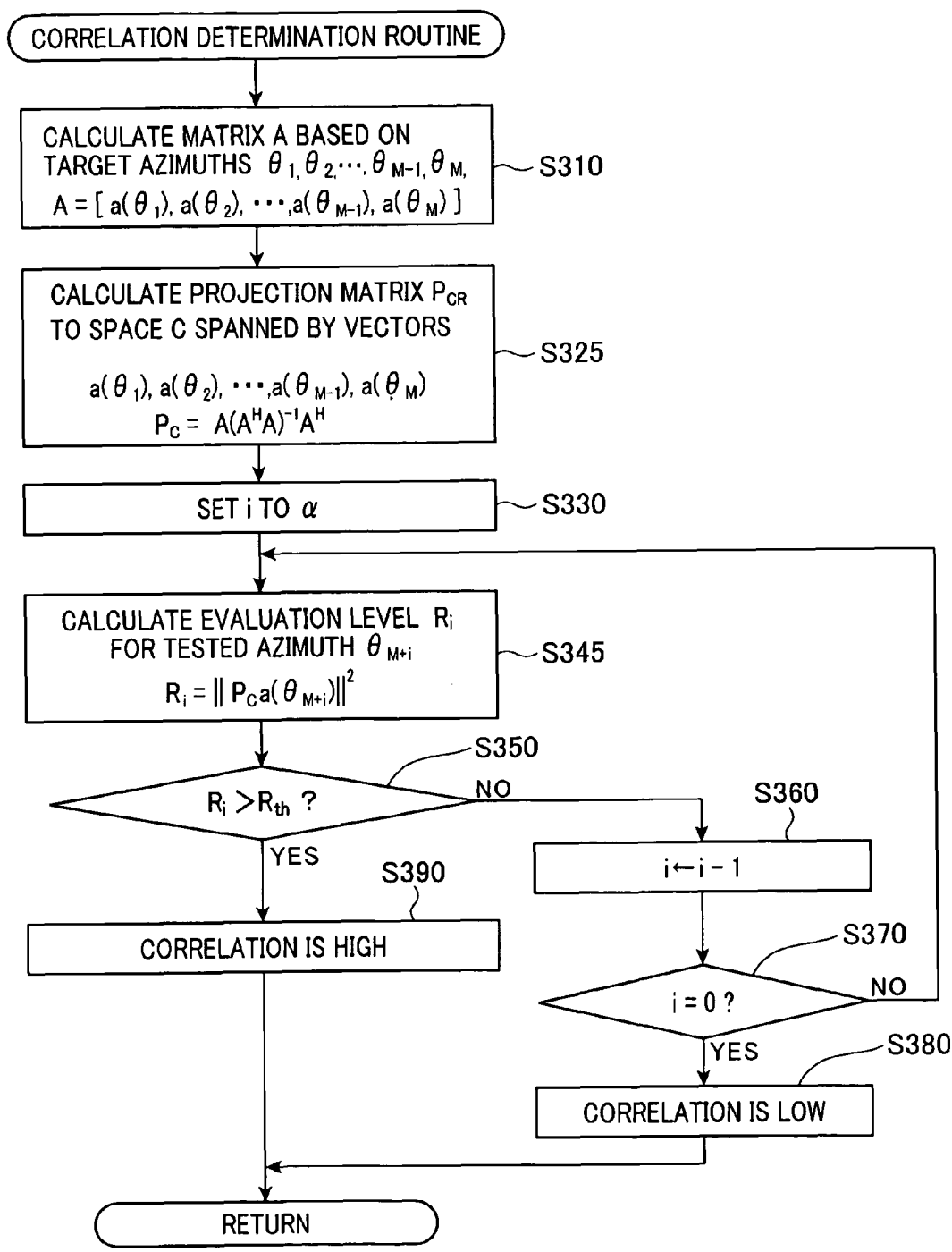
FIG. 14 is a flowchart schematically illustrating a correlation determination subroutine to be called in the target-azimuth estimation routine according to a fourth embodiment of the present invention.

The radar according to the fourth embodiment is programmed to carry out a correlation determination subroutine illustrated in FIG. 14 when the correlation determination subroutine is called in step S180 of the main routine. Like steps between the correlation determination subroutines illustrated in FIGS. 7 and 14, to which like reference characters are assigned, are omitted or simplified in description.

In place of step S320 of the correlation determination subroutine according to the first embodiment, the signal processor 30 calculates, in accordance with the following equation (23), a projection matrix $P_C$ orthogonal to a space C spanned by the steering vectors $\alpha(\theta_1), \ldots, \alpha(\theta_M)$ in step S325:

$$P_C = A(A^H A)^{-1} A^H \qquad (23)$$

In place of step S340 of the correlation determination subroutine according to the first embodiment, the signal processor 30 calculates an evaluation level $R_{M+i}$ for the criteria azimuth $\theta_{M+i}$ corresponding to the variable i in accordance with the following equation (24) in step S345.

$$R_{m+i} = \|P_C \cdot \alpha(\theta_{M+1})\|^2 \qquad (24)$$

The evaluation level $R_{M+i}$ calculated by the equation (12) means a level representing an evaluation of the linear independence between a steering vector $\theta_{M+i}$ and each of the steering vectors $\alpha(\theta_1), \ldots, \alpha(\theta_M)$.

Based on the equations (11) and (23), the equation "$P_C = I - P_{CR}$" is established.

Thus, the following equation is established:

$$1 - \|P_{CR} \cdot a(\theta_{M+i})\|^2 = 1 - a(\theta_{M+i})^H (1 - P_{CR}) a(\theta_{M+i})$$
$$= 1 - 1 + a(\theta_{M+i})^H P_{CR} a(\theta_{M+i})$$
$$= \|P_C \cdot a(\theta_{M+i})\|^2$$

Therefore, as well as the evaluation level, $R_{M+i} = 1 - \|P_{CR} \cdot \alpha(\theta_{M+i})\|^2$, the evaluation level $R_{M+i}$ equal to $\|P_C \cdot \alpha(\theta_{M+i})\|^2$ calculated by the equation (24) means a level representing an evaluation of the linear independence between a steering vector $\theta_{M+i}$ and each of the steering vectors $\alpha(\theta_1), \ldots, \alpha(\theta_M)$.

Accordingly, when the linear independence between the steering vector $\theta_{M+i}$ and the space C spanned by the steering vectors $\alpha(\theta_1), \ldots, \alpha(\theta_M)$ becomes high, the square of the norm $\|P_C \cdot \alpha(\theta_{M \leq i})\|$ becomes low. This allows, when the linear independence between the steering vector $\theta_{M+i}$ and the space C spanned by the steering vectors $\alpha(\theta_1), \ldots, \alpha(\theta_M)$ becomes high, the evaluation level $R_{M+i}$ defined by the equation (24) becomes low.

In contrast, when the linear independence between the steering vector $\theta_{M+i}$ and the space C spanned by the steering vectors $\alpha(\theta_1), \ldots, \alpha(\theta_M)$ becomes low, the square of the norm $\|P_C \cdot \alpha(\theta_{M+i})\|$ becomes high. This allows, when the linear independence between the steering vector $\theta_{M+i}$ and the space C spanned by the steering vectors $\alpha(\theta_1), \ldots, \alpha(\theta_M)$ to become low, the evaluation level $R_{M+i}$ defined by the equation (24) becomes high.

Thus, the evaluation level $R_{M+i}$ defined by the equation (24) allows determination of whether the level of the linear independence between the steering vector $\theta_{M+i}$ and the space C spanned by the steering vectors $\alpha(\theta_1), \ldots, \alpha(\theta_M)$ is high or low.

As described above, the radar according to the fourth embodiment is configured to calculate the evaluation level $R_{M+i}$ defined by the equation (24) and to determine, with high accuracy, whether the level of the correlations among the steering vectors $\alpha(\theta_1), \ldots, \alpha(\theta_n)$ is high or low based on the evaluation level $R_{M+i}$ defined by the equation (24). Thus, the radar according to the fourth embodiment achieves the same advantages as the radar 1 according to the first embodiment.

Fifth Embodiment

A radar according to the fifth embodiment of the present invention will be described hereinafter with reference to FIGS. 15A and 15B.

The structure of the radar according to the fifth embodiment is substantially identical to that of the radar according to the first or second embodiment except for the following different points. So, like parts between the radars according to the first or second embodiment and the fifth embodiment, to which like reference characters are assigned, are omitted or simplified in description.

The radar according to the fifth embodiment is programmed to carry out a correlation determination subroutine illustrated in FIG. 15A when the correlation determination subroutine is called in step S180 of the main routine.

When stating the correlation determination subroutine called in step S180 of the main routine, the signal processor 30 sets a variable i to the present number $\alpha$ in step S1010.

Next, the signal processor 30 selects, from the tested azimuths $\theta_1, \ldots, \theta_{n-M+\alpha}$, the number M of azimuths $\theta_1, \ldots, \theta_M$; this number M of azimuths $\theta_1, \ldots, \theta_M$ is matched with the number M of arrivals of echoes in step S1020. In step S1020, the signal processor 30 selects, from the remaining a criteria azimuths $\theta_{M+1}, \ldots, \theta_{M+\alpha}$, one azimuth $\theta_{M+1}$.

In step S1020, the signal processor 30 obtains steering vectors $\alpha(\theta_1), \ldots, \alpha(\theta_M), \alpha(\theta_{M+i})$ based on the number M of azimuths $\theta_1, \ldots, \theta_M$ and the one azimuth $\theta_{M+i}$, and calculates a matrix $Z_1$ based on the steering vectors $\alpha(\theta_1), \ldots, \alpha(\theta_M), \alpha(\theta_{M+i})$ in accordance with the following equation (25):

$$Z_1 = [\alpha(\theta_1), \alpha(\theta_2), \ldots, \alpha(\theta_{M-1}), \alpha(\theta_M), \alpha(\theta_{M+1})] \qquad (25)$$

Thereafter, the signal processor 30 calculates a matrix $W_i$ in accordance with the following equation (26) in step S1030:

$$W_i = Z_i^H Z_i \qquad (26)$$

After the calculation of the matrix $W_i$ in step S1030, the signal processor 30 calculates an absolute value of the determinant (det) of the matrix $W_i$ as an evaluation level $R_{M+i}$ for the linear independence among the steering vectors $\alpha(\theta_1), \ldots, \alpha(\theta_n)$ accordance with the following equation (27):

$$R_i = |\det(W_i)| \qquad (27)$$

Note that the higher the level of the linear dependence among the steering vectors $\alpha(\theta_1), \ldots, \alpha(\theta_M), \alpha(\theta_{M+i})$ is, the closer to zero the determinant of the matrix $W_i$ becomes.

For this reason, after the completion of the calculation of the evaluation level $R_{M+i}$, the signal processor 30 determines whether the calculated evaluation level $R_{M+i}$ is equal to or lower than the preset threshold level $R_{th}$ that has been determined in the design phase of the antenna array 19 in step S1050.

Upon determining that the calculated evaluation level $R_{M+i}$ is equal to or lower than the preset threshold level $R_{th}$ ($R_{M+i} \leq R_{th}$), the determination in step S1050 is affirmative, so the signal processor 30 proceeds to step S1090. In step S1090, the signal processor 30 determines that the level of the correlations among steering vectors $\alpha(\theta_1), \ldots, \alpha(\theta_n)$ is high, and thereafter, returns to step S190 of the main routine illustrated in FIG. 5.

Otherwise, upon determining that the calculated evaluation level $R_{M+i}$ is greater than the preset threshold level $R_{th}$ ($R_{M+i} > R_{th}$), the determination in step S1050 is negative, so the signal processor 30 proceeds to step S1060. In step S1060, the signal processor 30 decrements the variable i by 1, and thereafter, determines whether the updated variable i is equal to zero in step S1070.

Upon determining that the variable i is unequal to zero (NO in step S1070), the signal processor 30 returns to step S1020. Then, the signal processor 30 repeatedly carries out the operations in steps S1020 to S1060 based on the updated variable i to thereby calculate and store the evaluation level $R_{M+i}$ for the steering vector $\alpha(\theta_{M+i})$ corresponding to the variable i in accordance with the equation (27).

During repetitions of the operations in steps S1020 to S1060, when the updated variable i is equal to zero (YES in step S1070), the signal processor 30 determines that the level of the correlations among steering vectors $\alpha(\theta_1), \ldots, \alpha(\theta_n)$ is low, and thereafter, returns to step S190 of the main routine illustrated in FIG. 5.

That is, the correlation determination subroutine is designed to:

determine the level of the correlations among the steering vectors $\alpha(\theta_1), \ldots, \alpha(\theta_n)$ is high when at least one calculated evaluation level $R_{M+i}$ is equal to or lower than the preset threshold level $R_{th}$; and determine the level of the correlations among the steering vectors $\alpha(\theta_1), \ldots, \alpha(\theta_n)$ is low when all of the calculated evaluation levels $R_{M+i}$ are greater than the preset threshold level $R_{th}$.

As described above, the radar according to the fifth embodiment is configured to properly determine whether the level of the correlations among the steering vectors $\alpha(\theta_1), \ldots, \alpha(\theta_n)$ is high or low so as to evaluate the linear independence thereamong. Thus, it is possible to properly switch the number M' of power estimation targets to the number M of arrivals of echoes and to the number n of tested azimuths depending on whether undesired peaks appear in the MUSIC spectrum.

In the fifth embodiment, the signal processor 30 calculates the absolute value of the determinant (det) of the matrix $W_i$ as the evaluation level $R_{M+i}$ for the linear independence of the steering vector, but can calculate the condition number $\kappa(W_i)$ of the matrix $W_i$ as the evaluation level $R_{M+i}$.

Note that the higher the level of the linear dependence among the steering vectors $\alpha(\theta_1), \ldots, \alpha(\theta_M), \alpha(\theta_{M+i})$ is, the higher the condition number $\kappa(W_i)$ of the matrix $W_i$ is. Thus, the condition number $\kappa(W_i)$ of the matrix $W_i$ allows the level of the correlations among the steering vectors $\alpha(\theta_1), \ldots, \alpha(\theta_N)$ to be properly determined.

Specifically, when using the condition number $\kappa(W_i)$ of The matrix $W_i$ as the evaluation level $R_{M+i}$ according to a modification of the fifth embodiment, the signal processor 30 carries out steps S1045 and S1055 in place of steps S1040 and 1050 in FIG. 15A.

Referring to FIG. 15B, after the calculation of the matrix $W_i$ in step S1030, the signal processor 30 calculates the condition number $\kappa(W_i)$ of the matrix $W_i$ as the evaluation level $R_{M+i}$ for the linear independence among the steering vectors $\alpha(\theta_1), \ldots, \alpha(\theta_n)$ in accordance with the following equation (28):

$$R_i = \kappa W_i \quad (28)$$

After the completion of the calculation of the evaluation level $R_{M+i}$, the signal processor 30 determines whether the calculated evaluation level $R_{M+i}$ is greater than the preset threshold level $R_{th}$ that has been determined in the design phase of the antenna array 19 in step S1055.

Upon determining that the calculated evaluation level $R_{M+i}$ is greater than the preset threshold level $R_{th}$ ($R_{M+i} > R_{th}$), the determination in step S1055 is affirmative, so the signal processor 30 proceeds to step S1090. In step S1090, the signal processor 30 determines that the level of the correlations among steering vectors $\alpha(\theta_1), \ldots, \alpha(\theta_n)$ is high, and thereafter, returns to step S190 of the main routine illustrated in FIG. 5.

Otherwise, upon determining that the calculated evaluation level $R_{M+i}$ is equal to or lower than the preset threshold level $R_{th}$ ($R_{M+i} \leq R_{th}$), the determination in step S1050 is negative, so the signal processor 30 proceeds to step S1060 set forth above.

That is, the correlation determination subroutine according to the modification of the fifth embodiment is designed to:

determine the level of the correlations among the steering vectors $\alpha(\theta_1), \ldots, \alpha(\theta_n)$ is high when at least one calculated evaluation level $R_{M+i}$ is greater than the preset threshold level $R_{th}$; and determine the level of the correlations among the steering vectors $\alpha(\theta_1), \ldots, \alpha(\theta_n)$ is low when all of the calculated evaluation levels $R_{M+i}$ are equal to or lower than the preset threshold level $R_{th}$.

Sixth Embodiment

A radar according to the sixth embodiment of the present invention will be described hereinafter with reference to FIGS. 16A and 16B.

The structure of the radar according to the sixth embodiment is substantially identical to that of the radar according to the first or second embodiment except for the following different points. So, like parts between the radars according to the first or second embodiment and the sixth embodiment, to which like reference characters are assigned, are omitted or simplified in description.

Figure 16A:
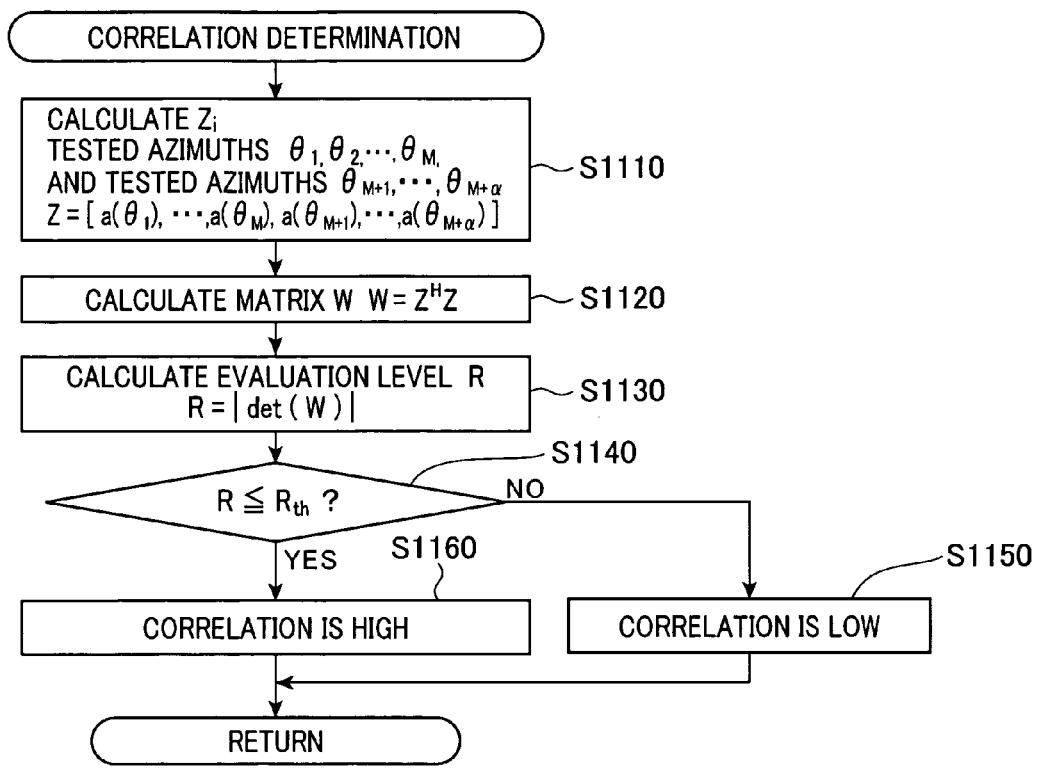
FIG. 16A is a flowchart schematically illustrating a correlation determination subroutine to be called in the target-azimuth estimation routine according to a sixth embodiment of the present invention.

The radar according to the sixth embodiment is programmed to carry out a correlation determination subroutine illustrated in FIG. 16A when the correlation determination subroutine is called in step S180 of the main routine.

When starting the correlation determination subroutine called in step S180 of the main routine, the signal processor 30 selects, from the tested azimuths $\theta_1, \ldots, \theta_{n=M+\alpha}$, the number M of azimuths $\theta_1, \ldots, \theta_M$; this number M of azimuths $\theta_1, \ldots, \theta_M$ is matched with the number M of arrivals of echoes in step S1110. In step S1110, the signal processor 30 recognizes the remaining $\alpha$ criteria azimuths $\theta_{M+1}, \ldots, \theta_{M+\alpha}$.

In step S1110, the signal processor 30 obtains steering vectors $\alpha(\theta_1), \ldots, \alpha(\theta_M)$ based on the number M of azimuths $\theta_1, \ldots, \theta_M$ and steering vectors $\alpha(\theta_{M+i}), \ldots, \alpha(\theta_{M+\alpha})$ based on the $\alpha$ criteria azimuths $\theta_{M+1}, \ldots, \theta_{M+\alpha}$, and calculates a matrix Z based on the steering vectors $\alpha(\theta_1), \ldots, \alpha(\theta_M), \alpha(\theta_{M+1}), \ldots \alpha(\theta_{M+\alpha})$ in accordance with the following equation (29):

$$Z = [\alpha(\theta_1), \ldots, \alpha(\theta_M), \alpha(\theta_{M+1}), \ldots \alpha(\theta_{M+\alpha})] \quad (29)$$

Thereafter, the signal processor 30 calculates a matrix W in accordance with the following equation (30) in step S1120:

$$W = Z^H Z \quad (30)$$

After the calculation of the matrix W in step S1120, the signal processor 30 calculates an absolute value of the determinant (det) of the matrix W as an evaluation level R for the linear independence among the steering vectors $\alpha(\theta_1), \ldots, \alpha(\theta_n)$ in accordance with the following equation (31):

$$R = |\det(W)| \quad (31)$$

After the completion of the calculation of the evaluation level R, the signal processor 30 determines whether the calculated evaluation level R is equal to or lower than the preset threshold level $R_{th}$ that has been determined in the design phase of the antenna array 19 in step S1140.

Upon determining that the calculated evaluation level R is equal to or lower than the preset threshold level R ($R \leq R_{th}$), the determination in step S1140 is affirmative, so the signal processor 30 proceeds to step S1160. In step S1160, the signal processor 30 determines that the level of the correlations among steering vectors $\alpha(\theta_1), \ldots, \alpha(\theta_n)$ is high, and thereafter, returns to step S190 of the main routine illustrated in FIG. 5.

Otherwise, upon determining that the calculated evaluation level R is greater than the preset threshold level $R_{th}$ ($R > R_{th}$), the determination in step S1140 is negative, so the signal processor 30 proceeds to step S1150. In step S1150, the signal processor 30 determines that the level of the correlations among steering vectors $\alpha(\theta_1), \ldots, \alpha(\theta_n)$ is low, and thereafter, returns to step S190 of the main routine illustrated in FIG. 5.

As described above, the radar according to the sixth embodiment is configured to properly determine whether the level of the correlations among the steering vectors $\alpha(\theta_1), \ldots, \alpha(\theta_n)$ is high or low so as to evaluate the linear independence thereamong. Thus, it is possible to properly switch the number M' of power estimation targets to the number M of arrivals of echoes and to the number n of tested azimuths depending on whether undesired peaks appear in the MUSIC spectrum.

Like the fifth embodiment, in the six embodiment, the signal processor 30 calculates the absolute value of the determinant (det) of the matrix W as the evaluation level R for the linear independence of the steering vector, but can calculate the condition number $\kappa(W)$ of the matrix W as the evaluation level R.

Specifically, when using the condition number $\kappa(W)$ of the matrix W as the evaluation level R according to a modification of the sixth embodiment, the signal processor 30 carries out steps S1135 and S1145 in place of steps S1130 and 1140 in FIG. 16A.

Figure 16B:
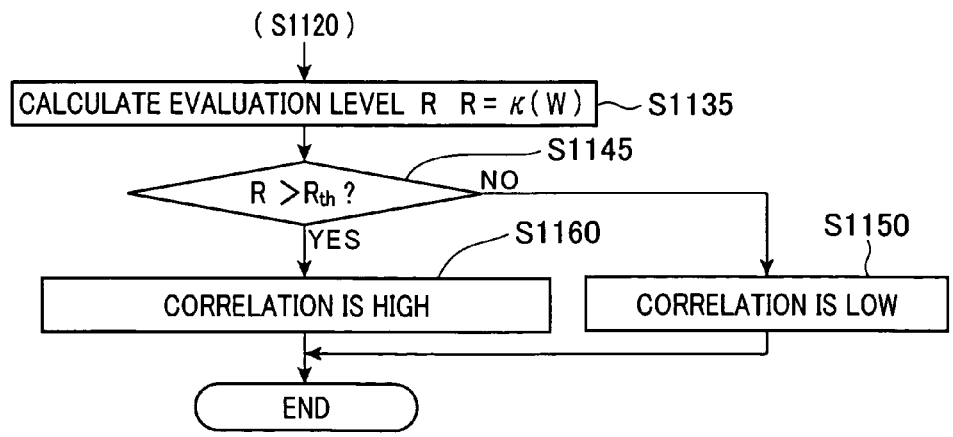
FIG. 16B is a flowchart schematically illustrating a correlation determination subroutine to be called in the target-azimuth estimation routine according to a modification of the sixth embodiment of the present invention.
Figure 17A:
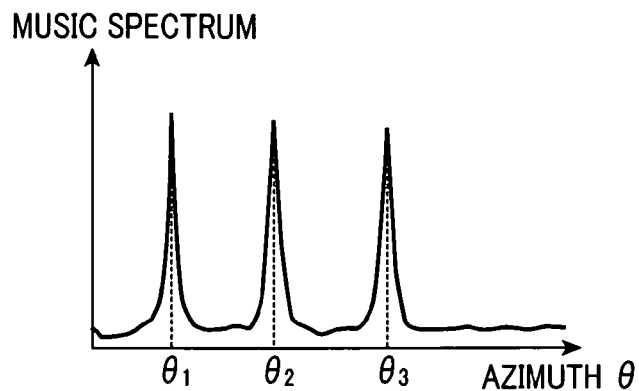
FIG. 17A is a graph schematically illustrating three shaper peaks appearing in a MUSIC spectrum obtained by a conventional radar.
Figure 17B:
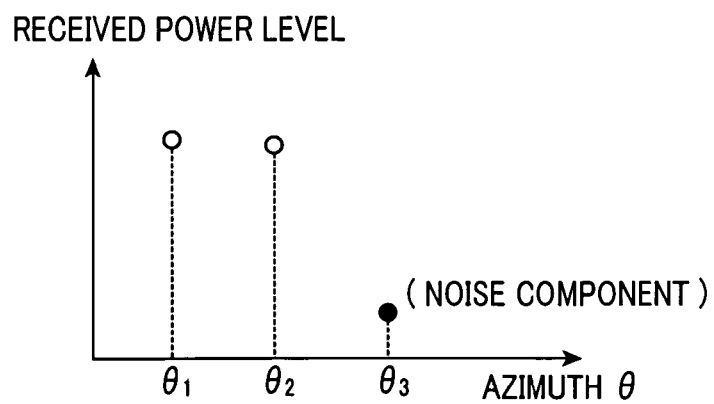
FIG. 17B is a graph schematically illustrating received power levels of the conventional radar corresponding to two desired peaks and one peak due to noise.
Figure 17C:
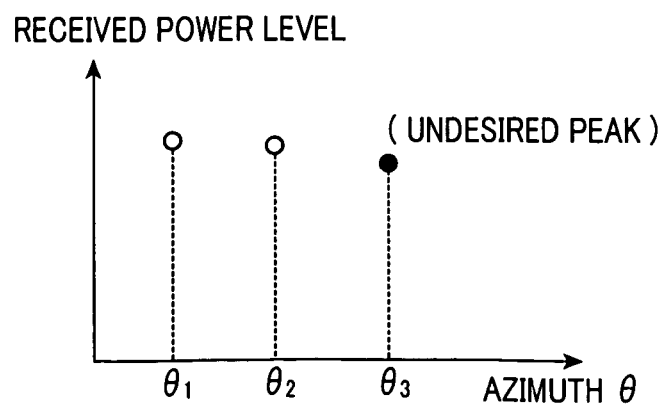
FIG. 17C is a graph schematically illustrating received power levels of the conventional radar corresponding to two desired peaks and one undesired peak.

Referring to FIG. 16B, after the calculation of the matrix W in step S1120, the signal processor 30 calculates the condition number $\kappa(W)$ of the matrix W as the evaluation level R for the linear independence of the steering vectors $\alpha(\theta_1), \ldots, \alpha(\theta_n)$ in accordance with the following equation (32) in step S1135:

$$R = \kappa W \quad (32)$$

After the completion of the calculation of the evaluation level R, the signal processor 30 determines whether the calculated evaluation level R is greater than the preset threshold level $R_{th}$ that has been determined in the design phase of the antenna array 19 in step S1145.

Upon determining that the calculated evaluation level R is greater than the preset threshold level $R_{th}$ ($R_{M+i} > R_{th}$), the determination in step S1145 is affirmative, so the signal processor 30 proceeds to step S1160. In step S1160, the signal processor 30 determines that the level of the correlations among steering vectors $\alpha(\theta_1), \ldots, \alpha(\theta_n)$ is high, and thereafter, returns to step S190 of the main routine illustrated in FIG. 5.

Otherwise, upon determining that the calculated evaluation level R is equal to or lower than the preset threshold level $R_{th}$ ($R_{M+i} \leq R_{th}$), the determination in step S1145 is negative, so the signal processor 30 proceeds to step S1150 set forth above.

Thus, it is possible to properly switch the number M' of power estimation targets to the number M of arrivals of echoes and to the number n of tested azimuths depending on whether undesired peaks appear in the MUSIC spectrum.

In each of the first to sixth embodiments, the preset number $\alpha$ can be specifically set to 1 or 2 because undesired peaks do not appear in the MUSIC spectrum very much.

While there has been described what is at present considered to be the embodiments and their modifications of the present invention, it will be understood that various modifications which are not described yet may be made therein, and it is intended to cover in the appended claims all such modifications as fall within the true spirit and scope of the invention.

What is claimed is:

1. A radar comprising:
   a radio wave transmitter and a receiver;
   an antenna array including a plurality of antennas arranged at non-uniform intervals, the antenna array being configured to receive echoes of a transmitted radio wave reflected from a target wherein each of the plurality of antennas provides a received signal; and
   at least one signal processor and associated circuits configured to provide:
   a correlation matrix generator generating an autocorrelation matrix for the received signals;
   an eigenvalue calculator which calculates a plurality of eigenvalues of the autocorrelation matrix;
   an extractor which estimates a number of echo arrivals to the antenna array based on the plurality of eigenvalues, and which extracts, from a plurality of eigenvectors respectively corresponding to the plurality of eigenvalues, at least one eigenvector corresponding to a noise component;
   a spectrum calculator which calculates a MUSIC spectrum based on the at least one eigenvector;
   a tested azimuth setter which extracts, from the MUSIC spectrum, a number of peaks, and which sets a number of azimuths corresponding to the number of extracted peaks as a number of tested azimuths, the number of tested azimuths being greater than the number of echo arrivals by a preset number;
   a determiner which determines a level of correlations among a number of steering vectors respectively corresponding to the number of tested azimuths;
   a power-estimation target selector which selects, from the number of tested azimuths, a number of azimuths as power-estimation targets based on the determined level of the correlations among the number of steering vectors;
   a first estimator which estimates a received power level from each of the power-estimation targets; and
   a second estimator which estimates, from the power-estimation targets, an azimuth of the target based on the estimated received power level from each of the power-estimation targets, the estimated received power level estimated by the first estimator being equal to or greater than a preset threshold level.

2. The radar according to claim 1, wherein the determiner determines whether the level of the correlations among the number of steering vectors is high or low, and the power-estimation target setter selectively functions accordingly so that:

when it is determined that the level of the correlations among the number of steering vectors is low, select, from the number of tested azimuths, the number of azimuths as the power-estimation targets, the number of azimuths as the power-estimation targets being in agreement with the estimated number of arrivals of echoes, the peaks in the MUSIC spectrum at the corresponding power-estimation targets being arranged in a descending order from a maximum peak in the peaks, and when it is determined that the level of the correlations among the number of steering vectors respectively corresponding to the number of tested azimuths is high, select all of the number of tested azimuths as the power-estimation targets.

3. The radar according to claim 1, wherein the determiner evaluates a linear independence among the number of steering vectors, and determines the level of the correlations among the number of steering vectors based on a plurality of evaluation levels indicative of the evaluated linear independence thereamong.

4. The radar according to claim 3, wherein the number of steering vectors is composed of a first number of steering vectors and a second number of steering vectors, the first number of steering vectors being in agreement with the number of echo arrivals, the peaks in the MUSIC spectrum corresponding to the first number of steering vectors being arranged in a descending order from a minimum peak in the peaks, and the determiner:

obtains a space spanned by the first number of steering vectors;

obtains a distribution of the second number of steering vectors with respect to the space; and evaluates, based on the obtained distribution, linear independence among the number of steering vectors.

5. The radar according to claim 4, wherein the determiner:
(a) executes at least one of:
  (i) a first operation to calculate a first norm defined based on a first projection matrix to the space; and
  (ii) a second operation to calculate a second norm defined based on a second projection matrix to an alternative space orthogonal to the space; and
(b) evaluates linear independence among the number of steering vectors based on one of (i) the first norm and (ii) the second norm.

6. The radar according to claim 5, wherein the number of echo arrivals is represented by M (M being an integer greater than 1), the preset number is represented by $\alpha$ so that the number of tested azimuths is represented by $(M+\alpha)$, the number of steering vectors is represented by the first projection matrix is represented by $P_C$, the second projection matrix is represented by $P_{CR}$, the first norm is represented by $\|P_C \cdot \alpha(\theta_{M+i})\|$ (i=1, ..., $\alpha$), and the second norm is represented by $\|P_{CR} \cdot \alpha(\theta M+i)\|$, and the determiner:

calculates the plurality of evaluation levels $R_{M+i}$ in accordance with one of the following equations:

$$R_{M+i} = \|P_C \cdot \alpha(\theta_{M+i})\|^2; \text{ and}$$

$$R_{M+i} = 1 - \|P_{CR} \cdot \alpha(\theta_{M+i})\|^2;$$

determines the level of the correlations among the number of steering vectors $\alpha(\theta_1), \ldots, \alpha(\theta_{M+\alpha})$ to be high when at least one of the plurality of evaluation levels $R_{M+i}$ is greater than a preset threshold level $R_{th}$; and determines the level of the correlations among the number of steering vectors $\alpha(\theta_1), \ldots, \alpha(\theta_{M+\alpha})$ to be low when all of the plurality of evaluation levels $R_{M+i}$ are equal to or lower than the preset threshold level $R_{th}$.

7. The radar according to claim 3, wherein the number of steering vectors is composed of a first number of steering vectors and a second number of steering vectors, the first number of steering vectors being in agreement with the number of echo arrivals, the peaks in the MUSIC spectrum corresponding to the first number of steering vectors being arranged in a descending order from a maximum peak in the peaks, and the determiner:

obtains one of:
(a) a plurality of determinants of a matrix defined by the first number of steering vectors and the second number of steering vectors;
(b) a plurality of condition numbers of the matrix defined by the first number of steering vectors and the second number of steering vectors; and evaluates, based on the obtained one of the plurality of determinants of the matrix and the plurality of condition numbers of the matrix, linear independence among the number of steering vectors.

8. The radar according to claim 7, wherein the number of echo arrivals is represented by M (M being an integer greater than 1), the preset number is represented by $\alpha$ so that the number of tested azimuths is represented by $(M+\alpha)$, the number of steering vectors is represented by $\alpha(\theta_1), \ldots, \alpha(\theta_{M+\alpha})$, the first number of steering vectors is represented by $\alpha(\theta_1), \ldots, \alpha(\theta_M)$, the second number of steering vectors is represented by $\alpha(\theta_{M+i})$, and the matrix represented by $W_i$ is defined by the following equation:

$$W_i = Z_i^H Z_i$$

where $Z_i = [\alpha(\theta_1), \alpha(\theta_2), \ldots, \alpha(\theta_{M-1}), \alpha(\theta_M), \alpha(\theta_{M+i})]$, and H represents transpose of complex conjugate, and the determiner:

calculates absolute values of the plurality of determinants of the matrix $W_i$ as evaluation levels of linear independence of the second number of steering vectors to the first number of steering vectors;

determines the level of the correlations among the number of steering vectors $\alpha(\theta_1), \ldots, \alpha(\theta_{M+\alpha})$ to be high when at least one of the evaluation levels is equal to or lower than a preset threshold level $R_{th}$; and determines the level of the correlations among the number of steering vectors $\alpha(\theta_1), \ldots, \alpha(\theta M+\alpha)$ to be low when all of the evaluation levels are greater than the preset threshold level $R_{th}$.

9. The radar according to claim 7, wherein the number of echo arrivals is represented by M (M being an integer greater than 1), the preset number is represented by $\alpha$ so that the number of tested azimuths is represented by $(M+\alpha)$, the number of steering vectors is represented by $\alpha(\theta_1), \ldots, \alpha(\theta_{M+\alpha})$, the first number of steering vectors is represented by $\alpha(\theta_1) \ldots, \alpha(\theta_M)$, the second number of steering vectors is represented by $\alpha(\theta_{M+i})$, and the matrix represented by W is defined by the following equation:

$$W = Z^H Z$$

where $Z = [\alpha(\theta_1), \alpha(\theta_2), \ldots, \alpha(\theta_{M-1}), \alpha(\theta_M), \alpha(\theta_{M+i})]$ and H represents transpose of complex conjugate, and the determiner:

calculates absolute values of the plurality of determinants of the matrix W as evaluation levels of linear independence of the second number of steering vectors to the first number of steering vectors;

determines the level of the correlations among the number of steering vectors $\alpha(\theta_1), \ldots, \alpha(\theta_{M+\alpha})$ to be high when at least one of the evaluation levels is equal to or lower than a preset threshold level $R_{th}$; and determines the level of the correlations among the number of steering vectors $\alpha(\theta_1), \ldots, \alpha(\theta_{M+\alpha})$ to be low when all of the evaluation levels are greater than the preset threshold level $R_{th}$.

10. The radar according to claim 7, wherein the number of echo arrivals is represented by M (M being an integer greater than 1), the preset number is represented by $\alpha$ so that the number of tested azimuths is represented by (M+$\alpha$), the number of steering vectors is represented by $\alpha(\theta_1), \ldots, \alpha(\theta_{M+\alpha})$, the first number of steering vectors is represented by $\alpha(\theta_1), \ldots, \alpha(\theta_M)$, the second number of steering vectors is represented by $\alpha(\theta_{M+i})$, and the matrix represented by $W_i$ is defined by the following equation:

$$W_i = Z_i^H Z_i$$

where $Z_i = [\alpha(\theta_1), \alpha(\theta_2), \ldots, \alpha(\theta_{M-1}), \alpha(\theta_M), \alpha(\theta_{M+i})]$, and H represents transpose of complex conjugate, and the determiner:
calculates the plurality of condition numbers of the matrix $W_i$ as evaluation levels of linear independence of the second number of steering vectors to the first number of steering vectors;

determines the level of the correlations among the number of steering vectors $\alpha(\theta_1), \ldots, \alpha(\theta_{M+\alpha})$ to be high when at least one of the evaluation levels is greater than a preset threshold level $R_{th}$; and determines the level of the correlations among the number of steering vectors $\alpha(\theta_1), \ldots, \alpha(\theta_{M+\alpha})$ to be low when all of the evaluation levels are equal to or lower than the preset threshold level $R_{th}$.

11. The radar according to claim 7, wherein the number of echo arrivals is represented by M (M is an integer greater than 1), the preset number is represented by $\alpha$ so that the number of tested azimuths is represented by (M+$\alpha$), the number of steering vectors is represented by $\alpha(\theta_1), \ldots, \alpha(\theta_{M+\alpha})$, the first number of steering vectors is represented by $\alpha(\theta_1), \ldots, \alpha(\theta_M)$, the second number of steering vectors is represented by $\alpha(\theta_{M+i})$, and the matrix represented by W is defined by the following equation:

$$W = Z^H Z$$

where $Z = [\alpha(\theta_1), \alpha(\theta_2), \ldots, \alpha(\theta_{M-1}), \alpha(\theta_M), \alpha(\theta_{M+i})]$, and H represents transpose of complex conjugate, and the determiner:
calculates the plurality of condition numbers of the matrix W as evaluation levels of linear independence of the second number of steering vectors to the first number of steering vectors;

determines the level of the correlations among the number of steering vectors $\alpha(\theta_1), \ldots, \alpha(\theta m_{+\alpha})$ to be high when at least one of the evaluation levels is greater than a preset threshold level $R_{th}$; and determines the level of the correlations among the number of steering vectors $\alpha(\theta_1), \ldots, \alpha(\theta_{M+\alpha})$ to be low when all of the evaluation levels are equal to or lower than the preset threshold level $R_{th}$.

12. The radar according to claim 3, further comprising:
a switch which switches the preset threshold level based on the plurality of evaluation levels obtained by the determiner.

13. The radar according to claim 12, wherein the preset threshold level is variable within a range of a plurality of values, and the switching unit stores therein information indicative of correspondences between the plurality of evaluation values and the plurality of values of the preset threshold level, and works to switch the preset threshold level within the range of the plurality of values according to each of the plurality of evaluation levels, the plurality of evaluation levels being divided into a plurality of sections, and the plurality of values include a value predetermined for each of the sections, and the value included in the plurality of values for each of the sections is set to correspond to a probability that the received power level for each of the number of tested azimuths being equal to or greater than the value of the plurality of values is less than a preset value.

14. The radar according to claim 1, wherein the number of tested azimuths set by the tested azimuth setter are divided into a plurality of combinations of azimuths, and the determiner includes determination data indicative of an evaluation level of linear independence between the azimuths of each of the plurality of combinations, the determiner determining the level of the correlations among the number of steering vectors based on the determination data.

15. The radar according to claim 1, wherein the number of steering vectors are divided into a plurality of combinations, some of the plurality of combinations of the number of steering vectors being higher in linear independence than a preset threshold and the remaining of the plurality of combinations of the number of steering vectors being lower in linear independence than the preset threshold, and the determiner includes determination data indicative of the plurality of combinations of the number of steering vectors, the determiner determining the level of the correlations among the number of steering vectors based on the determination data.

16. The radar according to claim 1, further comprising:
a switch which switches the preset threshold level based on a plurality of combinations of the number of tested azimuths.

17. The radar according to claim 16, wherein the preset threshold level is variable within a range of a plurality of values, and the switching unit stores therein information indicative of correspondences between the plurality of combinations of the number of tested azimuths and the plurality of values of the preset threshold level, and the preset threshold level is switched within the range of the plurality of values according to each of the plurality of combinations of the number of tested azimuths, the plurality of values including a value predetermined for each of the plurality of combinations of the number of tested azimuths, and the value included in the plurality of values for each of the plurality of combinations of the number of tested targets is set to correspond to a probability that the received power level for each of the plurality of combinations of the number of tested azimuths being equal to or greater than the value of the plurality of less than a preset value.

\* \* \* \* \*